US011679418B2

(12) United States Patent
Paulson et al.

(10) Patent No.: US 11,679,418 B2
(45) Date of Patent: Jun. 20, 2023

(54) AUTOMATICALLY INDIVIDUALLY SEPARATING BULK OBJECTS

(71) Applicant: RIOS Intelligent Machines, Inc., Palo Alto, CA (US)

(72) Inventors: Christopher A. Paulson, Redwood City, CA (US); Nicholas L. Choi, South San Francisco, CA (US); Christopher Lalau Keraly, San Francisco, CA (US); Matthew E. Shaffer, Menlo Park, CA (US); Laura Stelzner, Redwood City, CA (US); Leo Keselman, Santa Clara, CA (US); Anthony Canalungo, San Carlos, CA (US); Clinton J. Smith, San Francisco, CA (US)

(73) Assignee: RIOS Intelligent Machines, Inc., Menlo Park, CA (US)

( * ) Notice: Subject to any disclaimer, the term of this patent is extended or adjusted under 35 U.S.C. 154(b) by 82 days.

(21) Appl. No.: 17/232,912

(22) Filed: Apr. 16, 2021

(65) Prior Publication Data
US 2022/0331840 A1 Oct. 20, 2022

(51) Int. Cl.
*B07C 5/342* (2006.01)
*B07C 5/02* (2006.01)
(Continued)

(52) U.S. Cl.
CPC ............. *B07C 5/342* (2013.01); *B07C 5/02* (2013.01); *B07C 5/362* (2013.01); *G06T 1/0014* (2013.01);
(Continued)

(58) Field of Classification Search
CPC ............. B65G 47/5145; B65G 47/684; B65G 47/082; B65G 47/53; B65G 47/22;
(Continued)

(56) References Cited

U.S. PATENT DOCUMENTS 7,159,375 B2 * 1/2007 Hellmann ............... B65B 35/44
53/238
7,222,718 B2 * 5/2007 Tarlton ................ B65G 47/684
198/452
(Continued)

FOREIGN PATENT DOCUMENTS

WO WO-2022025909 A1 * 2/2022

*Primary Examiner* — Prasad V Gokhale
*Assistant Examiner* — Jessica L Burkman
(74) *Attorney, Agent, or Firm* — Bever, Hoffman & Harms, LLP

(57) ABSTRACT

A work cell and method for automatically separating objects disposed in 3D clusters includes dispensing the objects onto a horizontal conveying surface to form a 2D array, reforming the 2D array into a 1D stream in which the objects move in single-file in a predefined moving direction, utilizing a vision-based or other stationary sensing system to identify a selected target object in the 1D stream as the target object passes through an image capture (sensing) region, calculating trajectory data defining the target object's time-based position in the 1D stream, and then utilizing the trajectory data to control a robot arm or other object removal mechanism such that only the selected object is forcibly removed (e.g., swiped or picked-up) from the horizontal conveying surface. A continuous-loop-type conveying mechanism includes two parallel conveyor-belt-type conveying structures and associated belt-switching structures. An AI-powered vision system identifies new object shapes during preliminary learning phases.

1 Claim, 12 Drawing Sheets

(51) Int. Cl.
  *B07C 5/36* (2006.01)
  *G06V 20/10* (2022.01)
  *G06V 20/64* (2022.01)
  *G06T 7/20* (2017.01)
  *G06T 1/00* (2006.01)

(52) U.S. Cl.
  CPC ............... *G06T 7/20* (2013.01); *G06V 20/10* (2022.01); *G06V 20/647* (2022.01); *G06T 2207/30241* (2013.01)

(58) Field of Classification Search
  CPC ..... B65G 2201/047; B07C 5/342; B07C 5/02; B07C 5/362; G06V 20/10; G06V 20/647
  See application file for complete search history.

(56) References Cited

U.S. PATENT DOCUMENTS

| | | | |
|---|---|---|---|
| 8,151,969 B2* | 4/2012 | Hoene | B65G 47/82 198/370.07 |
| 10,207,296 B2* | 2/2019 | Garcia | B07C 5/36 |
| 11,414,230 B2* | 8/2022 | Schikevitz | B07C 5/36 |
| 2018/0154396 A1* | 6/2018 | Ritondo | B07C 5/02 |
| 2022/0254005 A1* | 8/2022 | Wilkinson | G06V 10/993 |

* cited by examiner

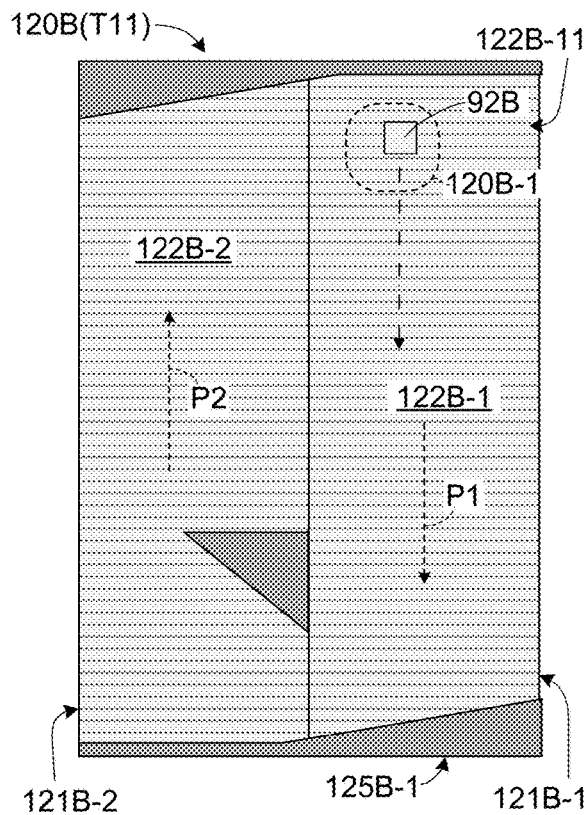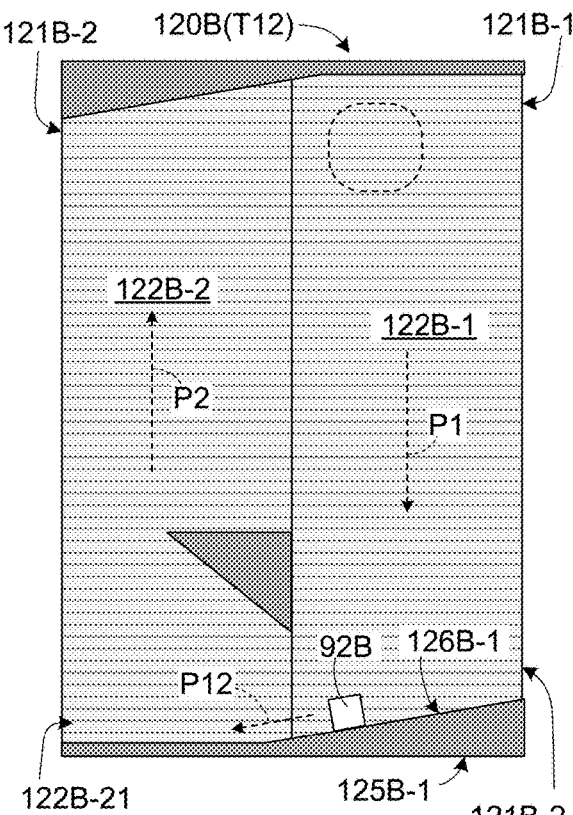
FIG. 5A          FIG. 5B
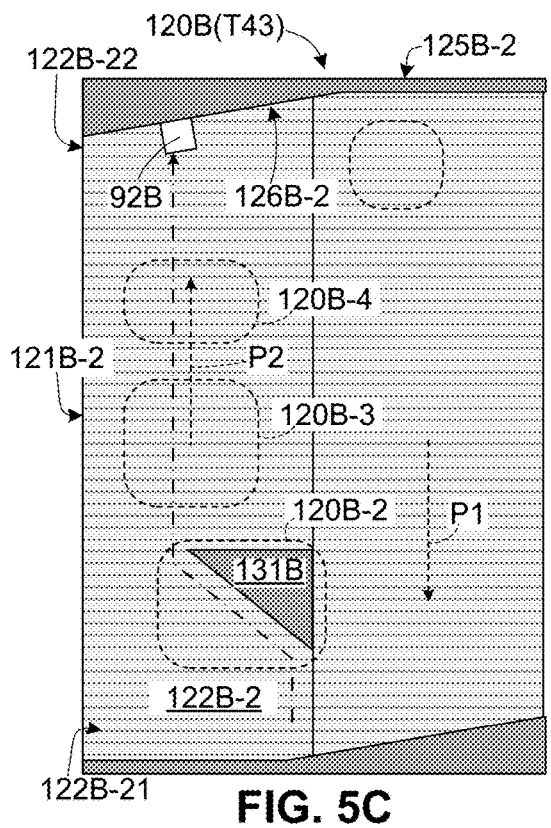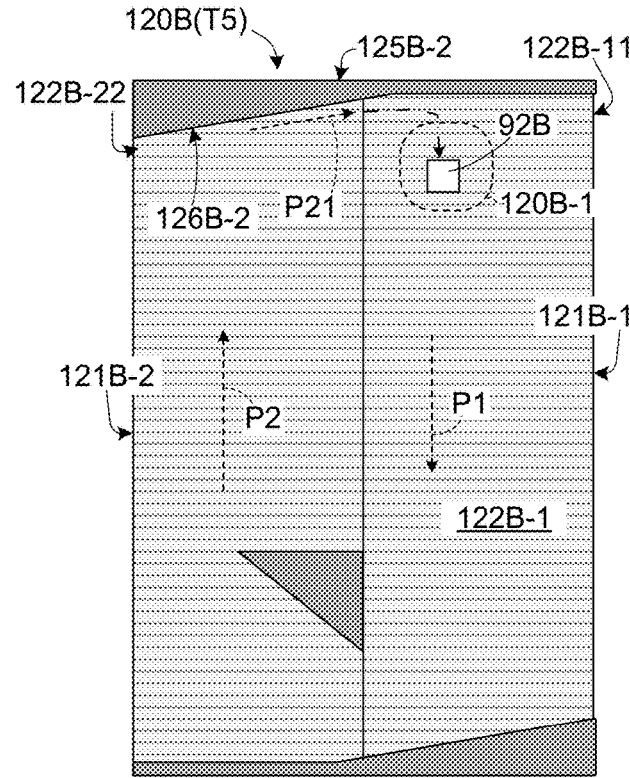
FIG. 5C          FIG. 5D

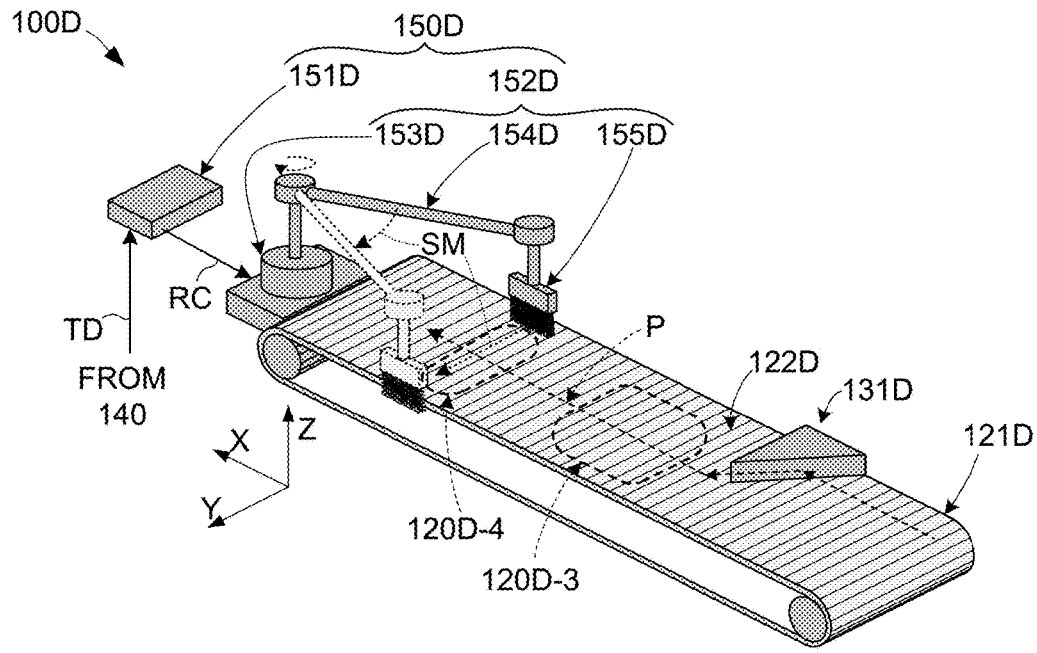
FIG. 8
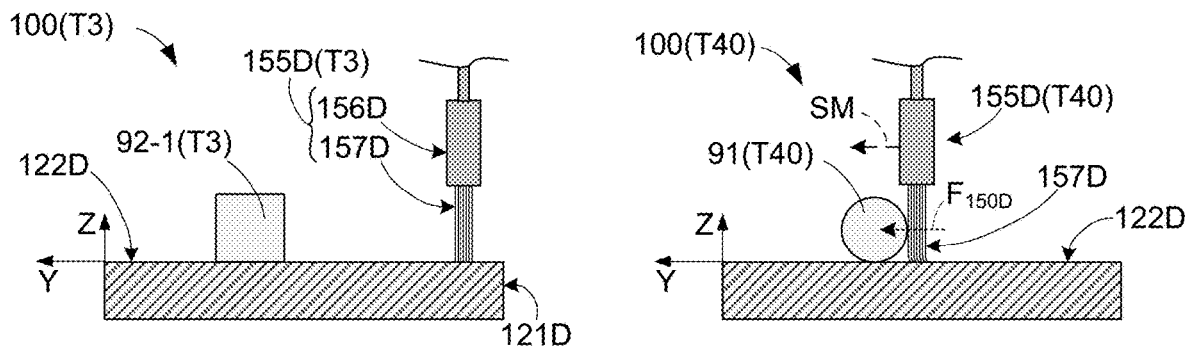
FIG. 9A  FIG. 9B
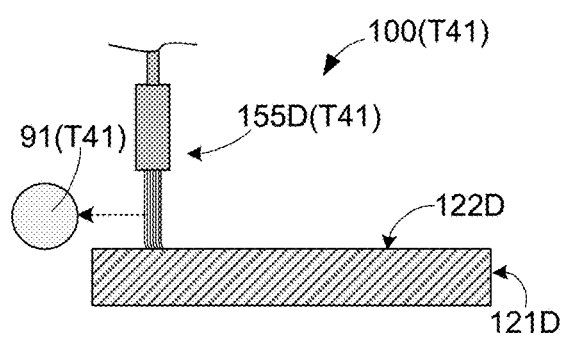
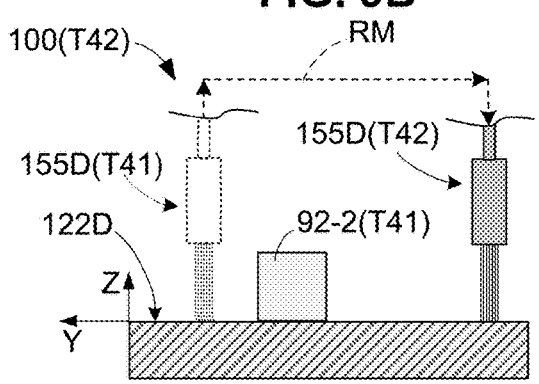
FIG. 9C  FIG. 9D

AUTOMATICALLY INDIVIDUALLY SEPARATING BULK OBJECTS

FIELD OF THE INVENTION

This invention relates to automated production systems, and more particularly to methods and work cells directed to processing bulk objects (i.e., many objects loosely contained in a 3D cluster).

BACKGROUND OF THE INVENTION

Labor shortages have incentivized manufacturers to turn to automation of manufacturing processes. One such process is the separation and handling of parts clustered together in bins. Existing manufacturing processes utilize humans to perform this operation, often at rates of 30-100 items per minute. An impediment towards automation of this repetitive manual process is that state of the art robotics cannot sort jumbled items in a bin at the rate and accuracy required by manufacturing. This is because existing robotic systems 1) have difficulty distinguishing objects that are jumbled together (in particular, transparent, or reflective/shiny objects), 2) have difficulty manipulating their end effectors to effectively pick up a target object at required rates and accuracies, and 3) cannot untangle items at rates and accuracies that meet requirements.

What is needed is a reliable and cost-effective work cell that is capable of automatically separating (i.e., identifying and individually removing) one or more objects disposed in a 3D cluster. What is particularly needed is a reliable and cost-effective work cell/method capable of receiving bulk objects and outputting individually separated objects in an entirely automated "contact-free" manner.

SUMMARY OF THE INVENTION

The present invention facilitates the automatic separation of individual objects from bulk objects disposed in a three-dimensional (3D) cluster (e.g., a box or bag filled with the bulk objects) by utilizing a two-stage process to automatically reform (convert) the 3D cluster into single-file, one-dimensional (1D) stream of objects, then identifying and generating trajectory data for a selected (target) object in the 1D stream, and then using the trajectory data to automatically individually remove the selected object from the 1D stream. The first stage of the two-stage process used to automatically reform a 3D cluster into a 1D stream includes dispensing the 3D cluster onto a horizontal two-dimensional (2D) conveying surface such that the objects collapse into a random 2D array, and the second stage involves forming the 2D array into a 1D stream in which each object is positioned between adjacent upstream and downstream objects as the 1D stream continues to move on the horizontal conveying surface in a horizontal path direction. This two-stage process greatly simplifies the task of identifying an individual selected "target" object (i.e., either one of multiple identical objects, or a desired object randomly disposed with dissimilar objects in the 3D cluster) by way of allowing a machine-vision (or other sensing) system to individually analyze the 3D cluster's constituent objects in a serial manner. Once a selected object is identified, trajectory data is generated that identifies the selected object's time-based location in the 1D stream, and then the calculated trajectory data is utilized to apply a separating force (e.g., a swiping force or air-jet blast applied by an associated object removal mechanism only on the selected object, whereby the selected object is individually removed (e.g., pushed into an autobagger or other post-separation processing device) without disturbing the other objects forming the 1D stream. The present invention thus provides a method for reliably and cost-effectively separating individual selected objects disposed in a 3D cluster in a contact-free manner (i.e., without requiring human contact of the objects during any phase of the separation process).

In one embodiment a work cell utilizes an object conveying mechanism, a singulating mechanism, a sensing system and an actuating mechanism (e.g., a robot arm or air-jet device) to individually separate a selected target object from a 3D cluster in a reliable automatic manner. The conveying mechanism includes a conveying structure having an upward-facing horizontal conveying surface that moves in a horizontal path direction. The conveying structure is configured such that, when the 3D cluster is dropped or otherwise dispensed onto the horizontal conveying surface in a designated receiving region, gravitational forces cause the dispensed objects to collapse into a randomly arranged 2D array, and such that low-level friction between the upward-facing horizontal conveying surface and the dispensed objects cause the 2D array to be conveyed (i.e., translated or otherwise transported) in the horizontal path direction toward the singulating mechanism. The singulating mechanism is fixedly disposed over the horizontal conveying surface and is operably configured (e.g., using one or more funnel-type or chicane-type structures) to bias the conveyed objects forming the 2D array such that they converge (i.e., are slidingly rearranged on the horizontal conveying surface) into a substantially 1D stream in which the target object is disposed between and respectively spaced from adjacent upstream and downstream "secondary" objects on the horizontal conveying surface in the horizontal path direction. The sensing system is fixedly disposed downstream of the singulating mechanism and configured to identify the target object in the 1D stream by way of distinguishing the target object from the secondary objects as the objects forming the 1D stream sequentially pass through a sensing region monitored by the sensing system. According to an aspect of the invention, the sensing system is further configured to calculate trajectory data for the target object (i.e., data describing the target object's time-based position/location on the horizontal conveying surface). The object removal mechanism is fixedly disposed downstream from the sensing region and is configured to selectively apply a separating force (e.g., a swiping force, a pick-up operation or a focused air-jet blast) at a location and time determined by the calculated trajectory data (e.g., when the target object passes through an actuation/removal region) such that only the target object is removed from the horizontal conveying surface (i.e., such that the upstream/downstream adjacent objects remain undisturbed and continue to be conveyed on the horizontal conveying surface). By utilizing the conveying and singulating mechanisms described herein to facilitate the reconfigure the jumbled objects of a 3D cluster into a spaced-apart single-file stream using a two-stage process, work units produced in accordance with the present invention facilitate both the reliable identification of each target object using a cost-effective sensing system, and also the reliable selective removal (separation) of individual target objects using cost-effective and reliable actuating mechanisms. That is, the conveying and singulating mechanisms described herein facilitate removal of the selected items at a rate and at an accuracy that meets the requirements of modern manufacturing processes.

As mentioned above, the conveyor mechanism and singulating mechanism of a work cell are cooperatively configured to convert 2D arrays of objects into 1D streams in an efficient, cooperative manner. In a preferred embodiment, this cooperative operation is efficiently achieved by utilizing a stationary singulating structure that is operably disposed over the horizontal conveying surface and configured to utilize each conveyed object's kinetic energy to reposition the object into the desired single-file arrangement. In a specific embodiment, the horizontal conveying mechanism is implemented using one or more horizontally disposed conveyor belts and the singulating mechanism is implemented using one or more chicane members. The horizontally disposed conveyor belt is configured such that an upward facing surface of its uppermost belt portion forms the horizontal conveying surface that conveys objects in the horizontal path direction, where at least one drive mechanism is operably connected to drive the conveyor belt at a predetermined conveying speed. Each chicane member is fixedly disposed over the conveyor belt and includes a vertically oriented, upstream-facing singulation surface that extends at an acute angle with reference to the horizontal path direction such that when each 2D array is conveyed by the conveyor belt against the chicane member, the target object and the plurality of secondary objects are biased by sliding contact with the singulation surface into single-file formation moving toward a downstream end of the singulation surface. The conveyor belt and chicane member are relatively positioned and formed from suitable low-friction materials that optimize both object conveyance and sliding contact during singulation. With this arrangement the target object becomes positioned between and respectively spaced from adjacent upstream and downstream objects as the objects are sequentially released (separated) from the downstream end of the chicane member, thereby simplifying both the subsequent sensing/identification and individual separation of the target object. That is, when the target object is both spaced by a first distance from an immediately adjacent (closest) downstream secondary object and spaced by a second distance from an immediately adjacent upstream secondary object, the present invention facilitates the reliable identification of each target object using a cost-effective sensing system. Moreover, spacing the target object from adjacent upstream/downstream objects also simplifies the process of exclusively removing the target object (i.e., without disturbing the adjacent upstream/downstream objects), thereby facilitating fast and reliable individual object separation using low-cost object removal mechanisms, such as commercially available robot arm mechanisms capable of swiping (brushing) the target object from the horizontal conveying surface.

In other embodiments, alternative conveyor mechanisms and singulating mechanisms may be utilized to implement work cells configured in accordance with the spirit and scope of the present invention (unless otherwise specified in the appended claims). For example, instead of a horizontally disposed conveyor belt, other moving horizontal surface types may be utilized to convey objects against a stationary (fixed) singulating mechanism or structure, and other (e.g., funnel-type) singulating mechanisms may be utilized in place of the chicane-type singulating mechanism described herein.

Although work cells can perform the automatic separating operation using straight-line conveying mechanisms, the use of continuous-loop-type conveying mechanisms facilitates lower-cost work cells having practical (small) footprints (e.g., 6' by 4'). In one embodiment, continuous-loop-type conveying mechanisms utilize two or more conveying structures that are cooperatively configured to move dispensed objects along a continuous "circuit" path such that at least some of the dispensed objects travel through one or more complete laps/circuits during operation of the work cell (i.e., where an object conveyed through a full lap/circuit moves from a receiving/dispensing region through the singulating region, the sensing region and the removal region before returning to the receiving/dispensing region). In a presently preferred embodiment, a continuous-loop-type conveying mechanism is implemented using two horizontally disposed conveyor belts of the type described above that are maintained in a parallel side-by-side arrangement and driven in opposite directions by corresponding drive mechanisms, and two belt-switching structures that are respectively disposed over adjacent upstream/downstream end portions of the two conveyor belts and configured to transfer objects from the downstream end of one conveyor belt to the upstream end of the other conveyor belt. That is, the two horizontally disposed conveyor belts are configured such that, during each continuous-loop circuit, an object moves in a (first) horizontal path direction on upward facing belt portion of one conveyor belt from its upstream end to its downstream end, then transferred by a first belt-switching structure to the upstream end of the second conveyor belt whose upward facing belt portion then conveys the object in a (second) horizontal path direction from the second conveyor belt's upstream end to its downstream end, and then the object is transferred by a second belt-switching structure back to the upstream end of the first conveyor belt. In a specific embodiment the belt-switching structures respectively include belt-switching surfaces that extends at an obtuse angle with reference to horizontal path directions such that objects conveyed against the belt-switching structure are biased by sliding contact with the belt-switching surface from the downstream end of one conveyor belt to the upstream end of the other conveyor belt. In addition to facilitating the production of cost-effective work cells having small footprints, the use of continuous loop-type conveyor mechanisms of the type described above facilitates the reliable separation of target objects by way of causing dispensed objects to interact multiple times with the belt-switching structures and the singulating mechanism. That is, the belt-switching structures function in a manner like that performed by the singulating mechanism to separate and rearrange multiple clumped-together objects into a single-file arrangement. Therefore, even if several objects are adhered or otherwise mildly stuck together in a 3D cluster when dispensed into the work cell's receiving area, the adhered objects are typically eventually separated after multiple circuits due to the separating/rearranging functions performed by the two belt-switching structures and one or more singulating member during each circuit.

In other embodiments, alternative continuous-loop-type conveying mechanisms may be utilized in place of the parallel side-by-side conveyor belt configuration. For example, a horizontal spinning disk-shaped structure or an airport-luggage-return-type mechanism may be utilized to convey objects in a loop-type circuit through designated singulation, sensing and removal regions in a manner like that described by the practical embodiments provided herein.

In presently preferred embodiments the process of sensing target objects and calculating trajectory data is performed by a vision-based sensing system including a digital camera configured to capture current image data as a 1D stream moves through an imaged region, and an image processing module that is configured to identify target objects by comparing the current image data with stored image data that operably visually describes the target objects, and is also configured to calculate trajectory data for each identified target object that operably describes a time-based location of the identified target object on the horizontal conveying surface. The use of vision-based sensing systems facilitates the production of low-cost, versatile work cells capable of accurately processing a wide range of different object types (i.e., objects having different shapes and sizes) by way of providing corresponding stored image data for each different object type. In addition to identifying target objects, the image data processing performed by vision-based sensing systems can also be used to perform other useful processes. For example, in some embodiments, the image processing module is further configured to verify that each identified target object is separated from an adjacent pair of upstream/downstream objects by at least a minimum offset distance before calculating and/or transmitting the associated trajectory data to an object removal mechanism. In other embodiments the image processing module is implemented as a stand-alone device that passes trajectory data directly to the object removal mechanism, and in other embodiments at least a portion of the image processing module is implemented by a central control unit utilized to coordinate a host work cell's operations, for example, to maintain an optimum number of objects conveyed on a continuous-loop-type conveying mechanism by monitoring the number (quantity) of objects disposed on the horizontal conveying surface at a given time, and controlling a hopper (or other object dispensing unit) to dispense additional objects when the monitored number falls below a predetermined minimum number. The use of vision-based sensing systems that process image data also facilitates the production of work cells that can quickly identify and store image data corresponding to new object shapes during an initial "learning" operating phase, and then utilize the stored data to process the new objects in the manner described herein. These and other useful processes can be efficiently implemented by way of reconfiguring commercially available vision systems using techniques known in the art, thereby making vision-based sensing systems preferred over other sensing systems (e.g., capacitance-based sensing systems, light gates, scales, varying sized bins, physical contact switches, etc.).

In presently preferred embodiments the process of removing (individually separating) target objects from the horizontal conveying surface is performed using one or more robot-based object removal (robotic) mechanisms. In one embodiment such robotic mechanisms include a robot control module that controls a robot arm mechanism including an arm structure having a fixed end movably connected to a stationary base and having a free (distal) end to which an end effector is connected. The control module is operably configured to manipulate the arm mechanism in accordance with trajectory data received from a sensing system such that the arm structure causes the end effector to apply a separating force on selected target objects. In a specific embodiment, the end effector includes a brush-type swiping structure including a ferrule fixedly connected to the arm structure and flexible bristles having fixed ends connected to and bodies extending from the ferrule. With this arrangement, the robotic object removal mechanism is controlled such that free ends of the plurality of flexible bristles brush across the horizontal conveying surface in a direction that is substantially perpendicular to the horizontal path direction when the arm structure causes the brush-type end effector to undergo a swiping motion that applies a separating force on a selected target object, whereby the target object is pushed off of the horizontal conveying surface by way of contact with flexible bristles. In some embodiments the robot control module is implemented as a stand-alone device that receives and processes trajectory data transmitted from a sensing system, and in other embodiments at least a portion of the robot control module is implemented by a central control unit utilized to coordinate a host work cell's operations, for example, to coordinate object removal operations with both trajectory data received from the sensing unit and the ready status of a processing unit (e.g., an autobagger unit) positioned to receive target objects removed by the robot-based object removal (robotic) mechanism. The use of robotic mechanisms having brush-type end effectors provides a low-cost, highly reliable mechanism for individually separating selected target objects from 1D streams. In other embodiments the target object removal process is performed other suitable object removal mechanisms (e.g., robotic systems that use gripper-type end effectors to grasp and lift (pick up) target objects off the horizontal conveying surface, or suction cups which affix to the surface of an object, enabling it to be lifted-up.

In a disclosed practical embodiment a robotic work cell utilizes a central control unit to coordinate operations performed by a hopper (dispensing unit), a continuous-loop-type conveyor mechanisms, a vision-type sensing system and robotic object removal mechanism to facilitate automatically feeding individual objects to a post-separation processing unit (e.g., an autobagger). In some embodiments the central control unit implements portions of one or more of the vision-type sensing system and the robotic object removal mechanism to facilitate efficient and versatile communications. In some embodiments work cells utilize AI-powered vision-type sensing systems that implement object recognition algorithms capable of quickly identifying new object types, thereby increasing the work cell's versatility.

BRIEF DESCRIPTION OF THE DRAWINGS

These and other features, aspects and advantages of the present invention will become better understood with regard to the following description, appended claims, and accompanying drawings, where:

FIGS. 5A, 5B, 5C and 5D are top views depicting exemplary operations performed by the continuous-loop-type horizontal conveying mechanism of FIG. 4B;

FIG. 8 is a perspective views showing a robotic object removal mechanism utilized by a robotic work cell to perform the method of FIG. 1 according to another exemplary specific embodiment;

FIGS. 9A, 9B, 9C and 9D are simplified elevation views depicting an exemplary object removal operation performed by the robotic object removal mechanism of FIG. 8;

DETAILED DESCRIPTION OF THE DRAWINGS

The present invention relates to an improvement in methods and work cells utilized to automatically sort/separate objects. The following description is presented to enable one of ordinary skill in the art to make and use the invention as provided in the context of a particular application and its requirements. As used herein, directional terms such as "upper" and "lower" are intended to provide relative positions for purposes of description and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
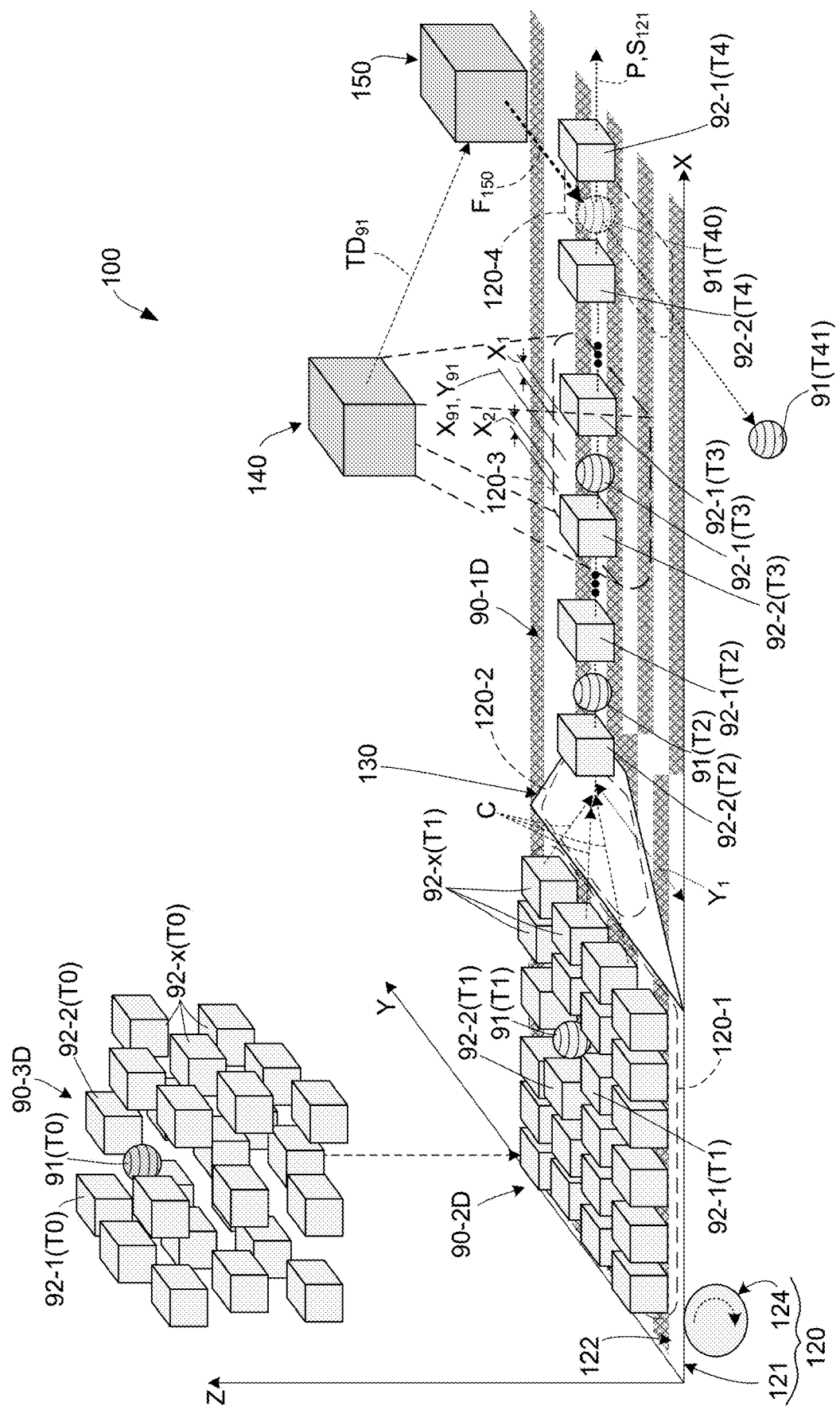
FIG. 1 is a perspective diagram depicting a method for automatically separating a target object from a 3D cluster using a generalized work cell according to an exemplary embodiment of the present invention.

FIG. 1 depicts a work cell 100 and an associated method for automatically separating an exemplary target object 91 from a group of secondary objects 92 that are randomly arranged in an exemplary 3D cluster 90-3D according to generalized embodiments. Referring to the upper portion of FIG. 1, exemplary 3D cluster 90-3D includes one target object 91 and multiple secondary objects 92, where two of these secondary objects are identified as secondary object 92-1 and secondary object 92-2, and the remaining secondary objects are generally identified as secondary objects 92-x. As used herein, the phrase "automatically separating" includes singularly identifying target object 91 (i.e., distinguishing target object 91 from secondary objects 92) and then singularly removing target object 91 (i.e., such that target object 91 is separated from all secondary objects 92 in a manner that facilitates, e.g., individual packaging or other individual processing of target object 91). That is, system 100 is configured to address the task of identifying and selectively (individually) removing target object 91 that is randomly disposed with multiple secondary objects 92 in a 3D cluster (e.g., jumbled together in sack, box, or another suitable container). In this sense, target object 91 may have any X-Y-Z coordinate position relative to any secondary object 92 of 3D cluster 90-3D.

Parenthetical time-based suffixes are utilized in the figures and description below to indicate certain objects or features at sequentially different points in time during the operation of an exemplary work cell. For example, time-based suffixes T0, T1, T2 and T3 are utilized in FIG. 1 to indicate different time-based versions of target object 91 and secondary objects 92-1, 92-2 and 92-x, where "91(T0)" indicates target object 91 at an initial time T0 when target object 91 is disposed in 3D cluster 90-3D, "91(T1)" indicates the same target object 91 at a subsequent time T1 after 3D cluster 90-3D has been dispensed and target object 91 is part of 2D array 90-2D, "91(T2)" indicates target object 91 after 2D array 90-2D has been reformed into 1D stream 90-1D, "91(T3)" indicates target object 91 when is passing through a sensing region 120-3, and "91(T3)" indicates target object 91 when passing through a removal region 120-4. Similar time-based suffixes are used to indicate relative positions of secondary objects 92-1, 92-2 and 92-x at times T0, T1, T2, T3 and T4. Similar time-based suffix values are used in sequential figures to indicate objects and features during various time sequences. In contrast, when an object or feature is mentioned below without a time-related suffix (e.g., "target object 91"), it is understood that the mentioned object or feature is being referenced generally (i.e., at any point before, during or after a separation process).

Figure 10:
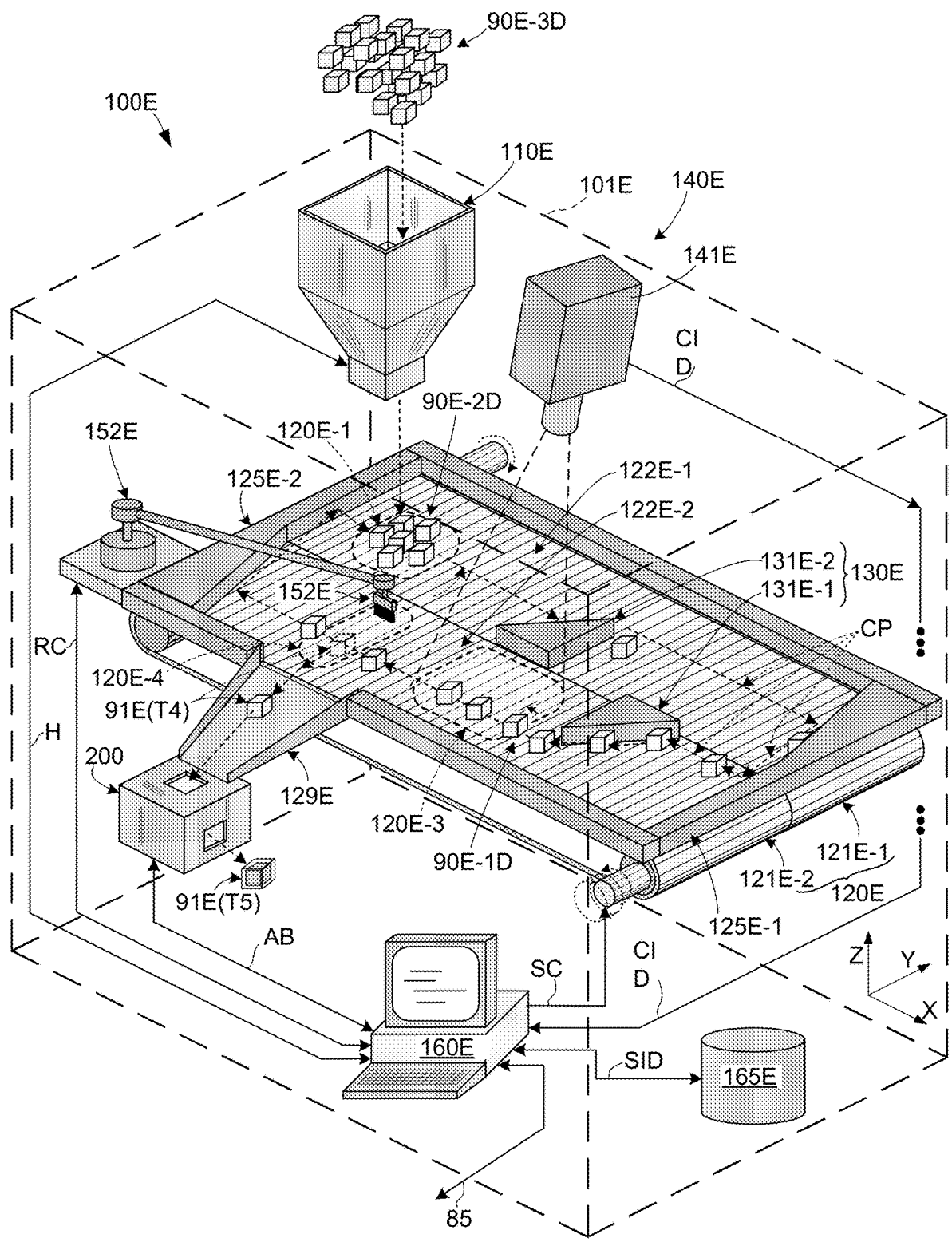
FIG. 10 is a perspective diagram depicting a simplified robotic work cell for automatically separating a target object from a 3D cluster according to another exemplary embodiment.

Referring to the left side of FIG. 1, conveying mechanism 120 generally includes a conveying structure 121 and a drive mechanism 124. Conveying structure 121 has an upward-facing horizontal conveying surface 122 configured such that target object 91 and secondary objects 92-1, 92-2 . . . 92-x form (i.e., collapse into) 2D array 90-2D on horizontal conveying surface 122 when 3D cluster 90-3D is dispensed in a receiving region 120-1 of conveying mechanism 120. Specifically, 3D cluster 90-3D is dispensed when target object 91 and secondary objects 92-1, 92-2 . . . 92-x are simultaneously released from a container (e.g., a hopper as indicated in FIG. 10, or from a box or bag) such that these objects freely fall (i.e., without vertical or lateral support) in the negative Z-axis direction due to gravitational force. The vertical descent of the dispensed objects is terminated when they strike horizontal conveying surface 122, whereby the lack of lateral support causes some of the objects to strike against each other and thus spread across a 2D (e.g., X-Y planar) portion of horizontal conveying surface 122, thereby forming 2D array 90-2D. Drive mechanism 124 is configured to drive the conveying structure 121 such that 2D array 90-2D is conveyed (i.e., transported or translated) on the horizontal conveying surface 122 in horizontal path direction P (e.g., in the X-axis direction in FIG. 1). In one embodiment target object 91(T1) and secondary objects 92-x(T1) are frictionally adhered to horizontal conveying surface 122 such that movement of horizontal conveying surface 122 in horizontal path direction P causes all objects forming array 90-2D to move in unison in horizontal path direction P. Note that in practical cases some objects may formed stacked arrangements upon being dispensed, but the objects forming these stacks are eventually dissociated by interaction with singulating mechanism 130, and therefore this case is omitted from the description for clarity and brevity. Also note that, because target object 91(T0) was randomly located within 3D cluster 90-3D, the X-Y position of target object 91(T1) in 2D array 90-2D is also random (i.e., the location of target object 91(T1) in FIG. 1 is arbitrarily selected for illustrative purposes).

Singulating mechanism 130 functions to interact with the objects forming array 90-2D such that the objects converge into a substantially single-file 1D stream 90-1D on horizontal conveying surface 122 with each object spaced in the horizontal path direction P from upstream/downstream pairs of adjacent objects. Singulating mechanism 130 is configured such that objects having any Y coordinate position in array 90-2D at time T1 are biased as indicated by converging dashed-line arrows C in FIG. 1 into a substantially single Y-axis coordinate. For example, target object 91(T1), secondary object 92-1(T1) and secondary object 92-2(T1) are positioned in respectively different Y coordinate positions at time T1 (i.e., before encountering singulating member 130), and are converged by singulating member 130 into a single-file configuration at time T2, where target object 91(T2) is disposed between adjacent upstream secondary object 92-1(T2) and adjacent downstream secondary object 92-2(T2), and where all three objects are aligned generally at a Y coordinate distance Yi and conveyed in this arrangement by movement of horizontal conveying surface 122 along horizontal path direction P. In a preferred embodiment, singulating member 130 is configured to interact with such that each of the objects forming 1D stream 90-1D is spaced from all other adjacent upstream/downstream objects (i.e., such that no two objects touch/abut each other). For example, target object 91(T2) is spaced by a distance $X_1$ from adjacent upstream secondary object 92-1(T2) and is spaced by a distance $X_2$ from adjacent downstream secondary object 92-2(T2). Note that in practical cases small groups of abutting objects may occur downstream from singulating member 130, but these groups of objects are eventually dissociated (separated into spaced-apart objects) by repeated interaction with singulating mechanism 130 in the manner described below, and therefore this case is omitted from the description for clarity and brevity. Note also that precise Y-axis positioning of each object forming 1D stream 90-1D is not critical, provided the objects are sequentially positioned in the horizontal path (X-axis) direction.

Sensing system 140 is configured to perform two operations: first, to identify a target object (e.g., object 91(T3)) in 1D stream 90-1D (e.g., as 1D stream 90-1D passes through a sensing region 120-3 located downstream from singulating mechanism 130); and second, to calculate trajectory data TD for each identified target object 91(T3). When processing a 3D cluster in which the desired target object has a different shape than non-desired "secondary" objects (e.g., as depicted by the spherical shape of target 91 and cube-shape of secondary objects 92-x in the example of FIG. 1), the identification process involves distinguishing the target object's shape from that of the secondary objects. In other embodiments the target object may be identified using other criteria, such as being spaced from all other objects by a minimum distance to facilitate easy individual separation. For example, target object 91(T3) may be identified for removal by determining that it is both spaced by a distance X1 from the closest downstream object in 1D stream 90-1D (i.e., secondary object 92-1(T3)) and spaced by a distance X2 from the closest upstream object in 1D stream 90-1D (i.e., secondary object 92-2(T3)), where distances X1 and X2 are greater than an established minimum distance. In some embodiments two or more criteria may be required before a target object is selected, such as both having a required shape and separation from adjacent objects by a minimum distance. The process of calculating trajectory data for an identified target object involves recording or generating data that describes the identified target object's time-based X-Y position/location on the horizontal conveying surface 122, where the data is in a form that can be transferred to and utilized by object removal mechanism 150 to successfully remove the identified target object from conveying structure 121. In the exemplary example shown in FIG. 1, sensing system 140 generates trajectory data $TD_{91}$ for target object 91(T3) as a function of its X,Y position (i.e., $X_{91}$, $Y_{91}$) on horizontal conveying surface 122 and its moving speed in horizontal path direction P (e.g., conveying speed 5121 of conveying structure 121), and then transmits trajectory data $TD_{91}$ to object removal mechanism 150.

Object removal mechanism 150 is configured to selectively apply a separating force $F_{150}$ on the target object 91(T40) as it passes through a removal region 120-4 such that only target object 91(T41) is removed from horizontal conveying surface 122. As set forth in additional detail below, various types of object removal mechanism may be used to generate separating force $F_{150}$ as a swiping (brushing) force, a grasping (picking-up) action, or as a non-contact force (e.g., an air jet pulse). Coordination between the generation of separating force $F_{150}$ by object removal mechanism 150 and the presence of target object 91(T40) in removal region 120-4 is achieved by way of configuring sensing system 140 to transmit trajectory data $TD_{91}$ at a time before or equal to time T40 (i.e., either concurrent with or before the arrival of target object 91(T40) in removal region 120-4). In one specific embodiment, sensing system 140 is configured to transmit trajectory data $TD_{91}$ at time T40, where transmit trajectory data $TD_{91}$ functions as a simple trigger signal that causes object removal mechanism 150 to generate/apply separating force $F_{150}$ immediately upon being received. In another embodiment, sensing system 140 is configured to generate trajectory data $TD_{91}$ before time T40, where trajectory data $TD_{91}$ includes time-based data regarding the location/position of target object 91 on horizontal conveying surface 122 and trajectory data $TD_{91}$, and object removal mechanism 150 includes a control circuit that generates/applies separating force $F_{150}$ at time T0. In either case, separating force $F_{150}$ is applied on target object 91(T40) in accordance with the calculated trajectory data $TD_{91}$ such that only target object 91(T41) is removed from horizontal conveying surface 122 (i.e., such that adjacent downstream secondary object 92-1(T4) and adjacent upstream secondary object 92-2(T4) remain undisturbed on horizontal conveying surface 122 and continue to be conveyed in path direction P by conveying structure 121).

Additional details related to the various mechanisms and systems utilized by work cell 100 are provided with reference to FIGS. 2A to 11. Although these additional details refer to presently preferred features and implementations, those skilled in the art understand that alternative mechanisms/systems may be utilized without deviating from the spirit and scope of the invention, and therefore these features and implementations are not limiting unless specifically referenced in the appended claims.

Figure 2A:
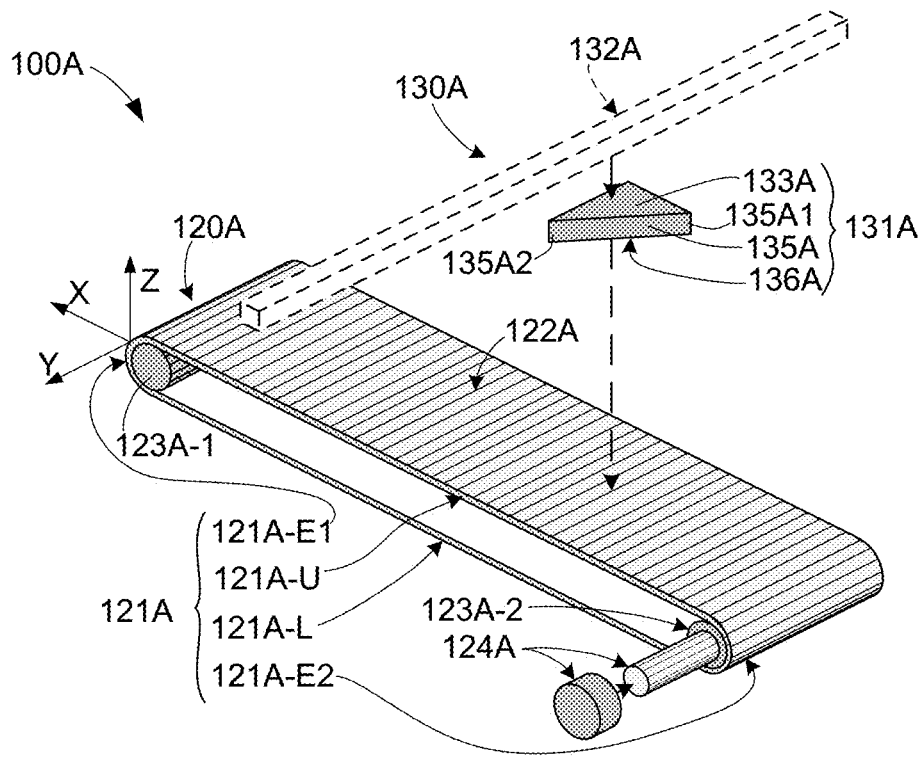
FIGS. 2A and 2B are exploded perspective and perspective views, respectively, showing a conveyor-belt-type horizontal conveying mechanism and a chicane-type singulating mechanism utilized by a work cell to perform the method of FIG. 1 according to an exemplary specific embodiment.
Figure 2B:
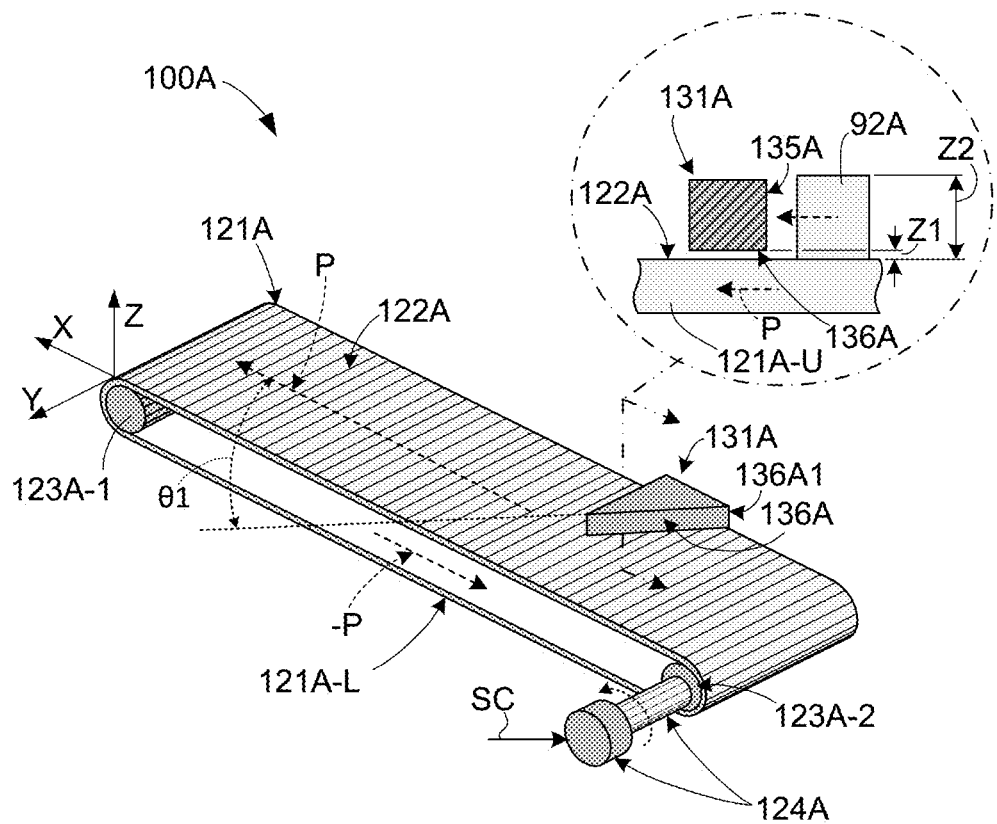

FIGS. 2A and 2B are exploded perspective and perspective views, respectively, showing a partial work cell 100A including a conveyor-belt-type conveying mechanism (conveyor mechanism) 120A and a chicane-type singulating mechanism 130A according to a specific embodiment.

Conveyor belt mechanism 120A includes a conveyor belt (conveying structure) 121A, horizontally oriented drive rollers 123A-1 and 123A-2 and a drive mechanism 123A. Conveyor belt (conveying structure) 121A is a continuous-loop structure trained over horizontally oriented drive rollers 123A-1 and 123A-2 and generally includes an upper belt portion 121A-U, a lower belt portion 121A-L, and two end portions 121A-E1 and 121A-E2 that are respectively extend over horizontally oriented drive rollers 123A-1 and 123A-2 between upper belt portion 121A-U and lower belt portion 121A-L. In this embodiment an upward facing surface of upper belt portion 121A-U (i.e., facing the positive Y-axis direction) forms the horizontal conveying surface 122A of conveyor belt mechanism 120A. Drive mechanism 124A (e.g., an electric motor) is operably coupled (e.g., by way of a gear train and/or drive shaft) to drive roller 123A-2, and is configured to cause horizontally oriented drive roller 123A-1 to rotate in the manner indicated in FIG. 2B at a rotating speed determined by a speed control signal SC, thereby causing the upper belt portion 121A-U to move in horizontal path direction P at a suitable horizontal conveying speed, whereby lower belt portion 121A-L moves in a direction −P that is opposite to path direction P.

Chicane-type singulating mechanism 130A includes a chicane structure 131A that is fixedly disposed (e.g., by way of a support rod 132A) over upward belt portion 121A-U of the conveyor belt 121A. As indicated in FIG. 2A, chicane structure 131A includes an upstream facing singulation surface 135A that is vertically oriented (i.e., extends in a plane that is parallel to the Z-axis between an upper surface 133A and an opposing lower surface 136A) and extends horizontally (i.e., in an X-Y plane) between an upstream end 135A1 and a downstream end 135A2. As indicated in FIG. 2B, chicane structure 131A is disposed over horizontal conveying surface 122A such that singulation surface 135A is maintained at an acute angle θ1 with reference to horizontal path direction P. As indicated by the elevation view shown in the bubble portion of FIG. 2B, chicane structure 131A fixedly mounted such that lower surface 136A is offset by a small distance Z1 from horizontal conveying surface 122A, where distance Z1 is substantially smaller than a nominal height Z2 of objects (generally indicated by exemplary object 92) expected to be processed by work cell 100A (i.e., to prevent objects from becoming wedged between lower surface 136A and horizontal conveying surface 122A). In a preferred embodiment, offset distance Z1 is approximately 100 microns. As indicated in the bubble section of FIG. 2 and described in detail below, when a 2D array including exemplary object 92A is conveyed against singulating mechanism 130A by upper belt portion 121A-U, object 92A is brought into contact with upstream-facing singulation surface 135A.

Figure 3A:
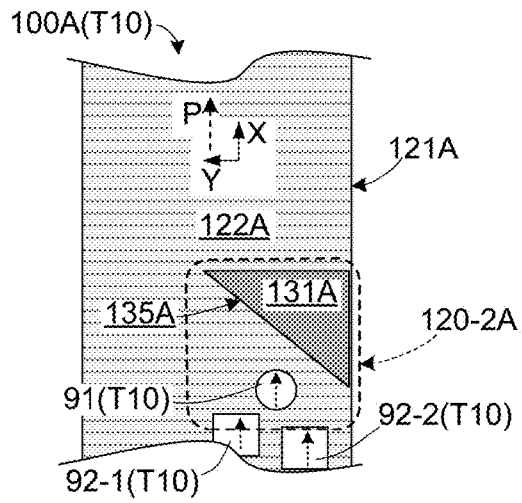
FIGS. 3A, 3B, 3C, 3D and 3E are partial top views depicting an exemplary singulating operation using the arrangement of FIG. 2B.
Figure 3B:
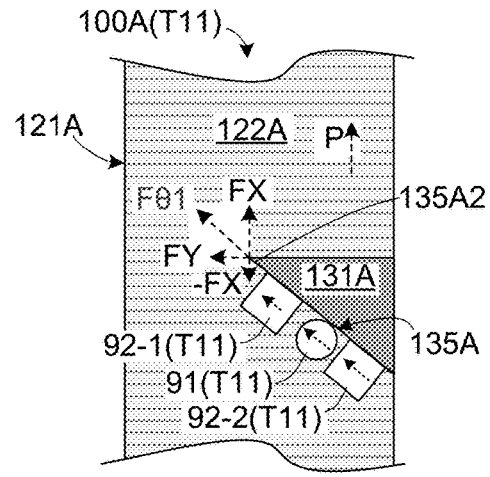
Figure 3C:
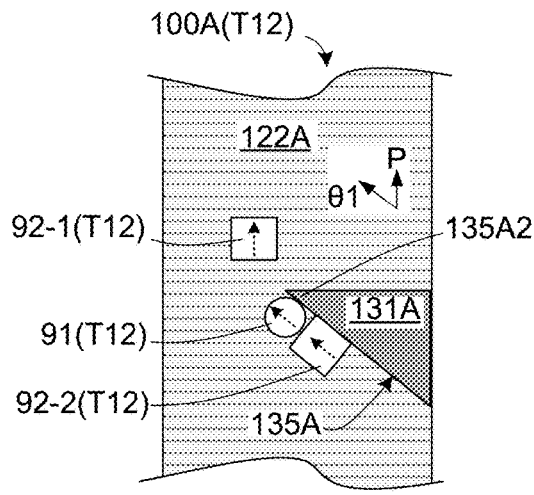
Figure 3D:
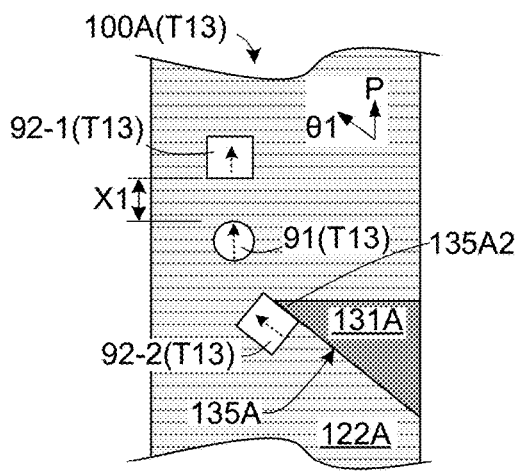
Figure 3E:
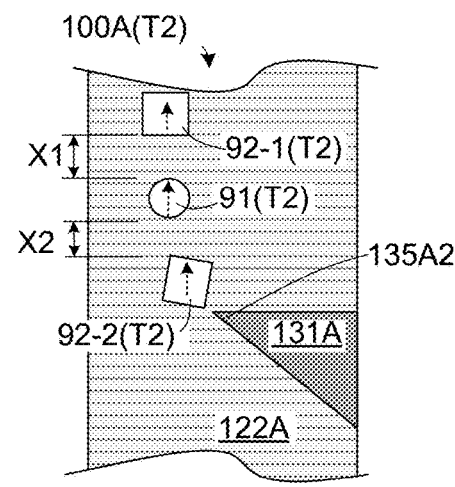

FIGS. 3A to 3E are partial top views depicting work cell 100A during an exemplary singulating operation that is cooperatively performed by conveyor belt mechanism 120A and chicane-type singulating mechanism 130A on an exemplary 2D array including target object 91 and secondary objects 92-1 and 92-2. Note that the small arrows disposed on each object indicates their respective relative moving directions at each depicted time. For example, FIG. 3A depicts work cell 100A at an initial time T10 when all three objects 91(T10), 92-1(T10) and 92-2(T10) are being moved by conveying structure 121A in horizontal path direction P toward singulation surface 135A of chicane structure 131A. As depicted by FIGS. 3B to 3E, when these objects are subsequently conveyed against chicane structure 131A by conveying structure 121A, target object 91 and secondary objects 92-1 and 92-2 are biased by sliding contact with singulation surface 135A such that the objects leave downstream end 135A2 of singulation surface 135A in a single-file formation with target object 91 positioned between and respectively spaced from secondary objects 92-1 and 92-2. That is, FIG. 3B shows work cell 100A at a time T11 after target object 91(T11) and secondary objects 92-1(T11) and 92-2(T11) have been conveyed into contact with singulation surface 135A, whereby these objects move in single-file formation toward downstream end 135A2. Specifically, target object 91(T11) and secondary objects 92-1(T11) and 92-2(T11) receive a total force Fθ1 generated by a force component FX applied by conveying structure 121A to bottom surfaces of the objects, and by force components −FX and FY applied by contact with singulation surface 135A, whereby target object 91(T11) and secondary objects 92-1(T11) and 92-2(T11) are biased by sliding contact with singulation surface 135A and horizontal conveying surface 122A toward the downstream end 135A2. In one embodiment, to facilitate the desired sliding contact depicted in FIGS. 3B to 3D, conveyor belt 121A comprises acetal (low friction material) and chicane structure 131A comprises a plastic exhibiting high durability, low friction, and high chemical resistance, such as ultra-high molecular weight polyethylene (UHMW), synthetic rubber, and/or Teflon™. FIG. 3C shows work cell 100A at a time T12 after adjacent downstream object 92-1(T12) has cleared downstream end 135A2 of singulation surface 135A and has resumed movement in horizontal path direction P due to contact with horizontal conveying surface 122A. Note that target object 91(T12) and upstream object 92-2(T12) remain in sliding contact with singulation surface 135A, and therefore continue to move in direction e1 toward downstream end 135A2. Similarly, FIG. 3D shows work cell 100A at a time T13 after target object 91(T13) has cleared downstream end 135A2 of singulation surface 135A and has resumed movement in horizontal path direction P, and upstream object 92-2(T12) remains in sliding contact with singulation surface 135A and moves in direction e1. Note that the sequential release of downstream secondary object 92-1(T13) and target object 91(T13) from downstream end 135A2 produces a gap spacing X1. Finally, FIG. 3E shows work cell 100A at a time T2 after all three objects are downstream from chicane member 131A and have resumed movement in horizontal path direction P on horizontal conveying surface 122A. Note that the release of upstream object 92-2(T2) from downstream end 135A2 produces a gap spacing X2 between upstream object 92-2(T2) and target object 91(T2), whereby target object 91(T2) becomes positioned between and respectively spaced from adjacent upstream object 92-1(T2) and from adjacent downstream object 92-2(T2) in horizontal path direction P when these objects sequentially separate from downstream end 135A2 of singulation surface 135A.

Figure 4A:
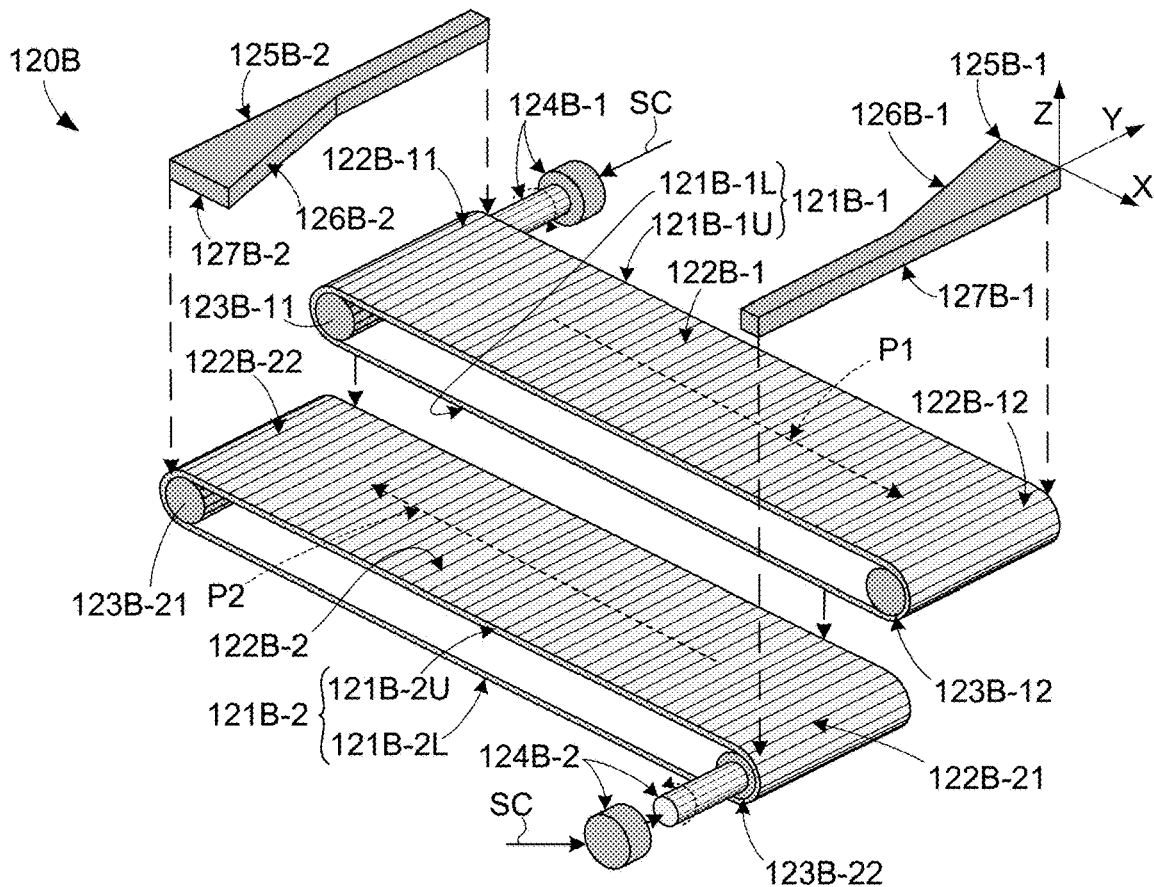
FIGS. 4A and 4B are exploded perspective and perspective views, respectively, showing a continuous-loop-type horizontal conveying mechanism utilized by a work cell to perform the method of FIG. 1 according to another exemplary specific embodiment.
Figure 4B:
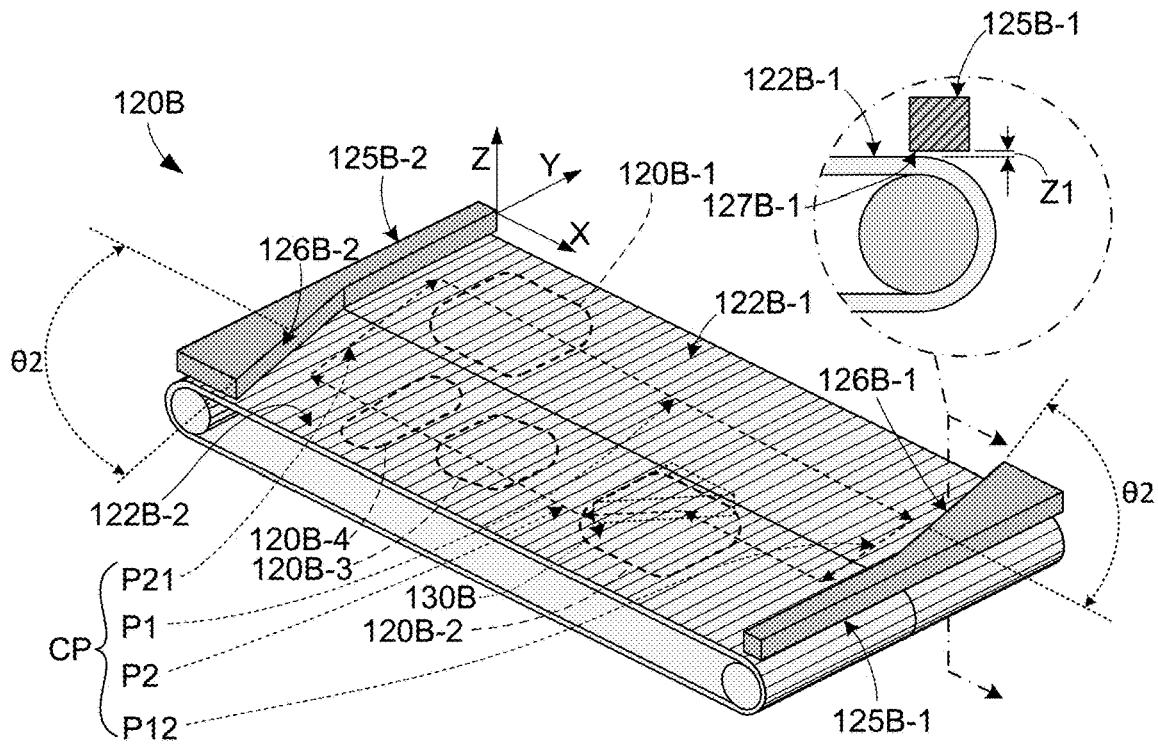

FIGS. 4A and 4B show a continuous-loop-type horizontal conveying mechanism 120B including two conveyor belt-type conveying structures 121B-1 and 121B-2 that are configured in cooperation with belt-switching structures 125B-1 and 125B-2 to convey objects in a loop-type circuit from a receiving region 120B-1 through a singulation region 120B-2, a sensing region 120B-3, and a removal region 120B-4. That is, conveying mechanism 120B is configured such that at least some (e.g., secondary) objects of a 3D cluster that is dispensed into receiving region 120B-1 are conveyed by conveying structures 121B-1 and 121B-2 to singulating region 120B-2, in which a singulating mechanism 130B is disposed, then to sensing region 120B-3, then to removal region 120B-4, and then finally returned to receiving region 120B-1.

Referring to FIG. 4A, each conveying structure of loop-type horizontal conveying mechanism 120B is configured in the manner described above with reference to FIGS. 2A and 2B. Specifically, conveyor belt (conveying structure) 121B-1 is trained over (first) horizontally oriented drive rollers 123B-11 and 123B-12 such that the upward facing portion of its upper belt portion 121B-1U provides a first horizontal conveying surface portion 122B-1, and conveyor belt 121B-2 is trained over (second) horizontally oriented drive rollers 123B-21 and 123B-22 such that the upward facing portion of upper belt portion 121B-2U provides a second horizontal conveying surface portion 122B-2. Conveyor belts 121B-1 and 121B-2 are disposed in a parallel side-by-side arrangement and driven by drive mechanisms 124B-1 and 124B-2 (e.g., in response to a common speed control signal SC), respectively, such that upward facing portion 122B-1 moves in a horizontal path direction P1 (e.g., parallel to the X-axis direction), and such that second upward facing portion 122B-2 moves in horizontal path direction P2 that is opposite to horizontal path direction P1 (i.e., in the negative X-axis direction). As described above, with this horizontal conveyor belt configuration, lower portions 121B-1L and 121B-2L of conveyor belts 121B-1 and 121B-2 move in directions opposite to their respective upper belt portions.

As indicated in FIGS. 4A and 4B, each belt-switching structure 125B-1 and 125B-2 is respectively disposed over adjacent end portions of conveyor belts 121B-1 and 121B-2 and includes a belt-switching surface that is configured to transfer objects from the downstream end of one conveyor belt to the upstream end of the other conveyor belt. As indicated in FIG. 4A, belt-switching structure 125B-1 includes a vertically oriented, upstream-facing belt-switching surface 126B-1 and has a lower surface 127B-1, and belt-switching structure 125B-2 includes a similar upstream-facing belt-switching surface 126B-2 and a lower surface 127B-2. As indicated in FIG. 4B, when belt-switching structure 125B-1 is operably fixedly mounted over adjacent end portions of conveyor belts 121B-1 and 121B-2 (i.e., over downstream end 122B-12 of conveyor belt 121B-1 and upstream end 122B-21 of conveyor belt 121B-2), upstream-facing belt-switching surface 126B-1 extends at an obtuse angle θ2 with reference to horizontal path direction P1. Similarly, belt-switching structure 125B-2 is operably fixedly mounted over downstream end 122B-21 of conveyor belt 121B-2 and upstream end 122B-12 of conveyor belt 121B-1, and upstream-facing belt-switching surface 126B-2 extends at obtuse angle θ2 with reference to horizontal path direction P2. As indicated in the bubble section of FIG. 4B, belt-switching structure 125B-1 is supported such that lower surface 127B-1 fixedly maintained at a small distance (e.g., distance Z1, described above) over horizontal conveying surface 122B-1. With the arrangement depicted in FIG. 4B, belt-switching structures 125B-1 and 125B-2 are configured to transfer objects between conveyor belts 121B-1 and 121B-2 as described below with reference to FIGS. 5A to 5D such that at least some of the objects (e.g., "secondary" objects that are not selected for removal) travel along a horizontal circuit-type path direction CP collectively formed by horizontal path component directions P1 (provided by conveyor belt 121B-1), P12 (i.e., a transition from path 1 to path 2, produced by sliding contact with belt switching structure 125B-1, P2 (provided by conveyor belt 121B-2) and P21 (produced by sliding contact with belt switching structure 125B-2).

FIGS. 5A to 5D depict a circuit traveled by an exemplary object 92B during operation of loop-type horizontal conveying mechanism 120B. In these figures, conveyor belts 121B-1 and 121B-2 are driven as described above such that upward facing surface 122B-1 continuously moves in horizontal path direction P1 and upward facing surface 122B-2 continuously moves in horizontal path direction P2. FIG. 5A depicts conveying mechanism 120B at a time T11 when object 92B is dispensed into receiving region 120B-1 or otherwise disposed adjacent to upstream end 122B-11 of conveyor belt 121B-1, whereby object 92B is conveyed on upward facing surface 122B-1 in direction P1 toward belt-switching structure 125B-1. FIG. 5B depicts conveying mechanism 120B at a time T12 when object 92B has been conveyed by conveyor belt 121B-1 to downstream end 122B-12 and against belt-switching structure 125B-1. At this point object 92B is biased in a (third) horizontal path direction P12 by sliding contact with upward facing surface 122B-1 and belt-switching surface 126B-1 toward upstream end 122B-21 of conveyor belt 121B-2, whereby object 92B is subsequently transferred onto upward facing surface 122B-2 and thus conveyed in horizontal path direction P2. FIG. 5C depicts conveying mechanism 120B at a time T43 after object 92B has been conveyed on upward facing surface 122B-2 along the path indicated by the dash-dot-arrow through singulating region 120B-2 (where its position relative to path direction P2 is altered by chicane member 131B in the manner described above), then sensing region 120B-3, then removal region 120B-4, and finally to downstream end 122B-22 of conveyor belt 121B-2. FIG. 5D depicts conveying mechanism 120B at a time T5 when object 92B has been biased by sliding contact with conveyor belt 121B-1 and belt-switching structure 125B-2 along (fourth) horizontal path direction P21 such that it is transferred from downstream end 122B-22 of conveyor belt 121B-2 to upstream end 122B-11 of conveyor belt 121B-1 and is then returned to receiving region 120B-1 on upward facing surface 122B-1 of conveyor belt 121B-1.

Figure 6:
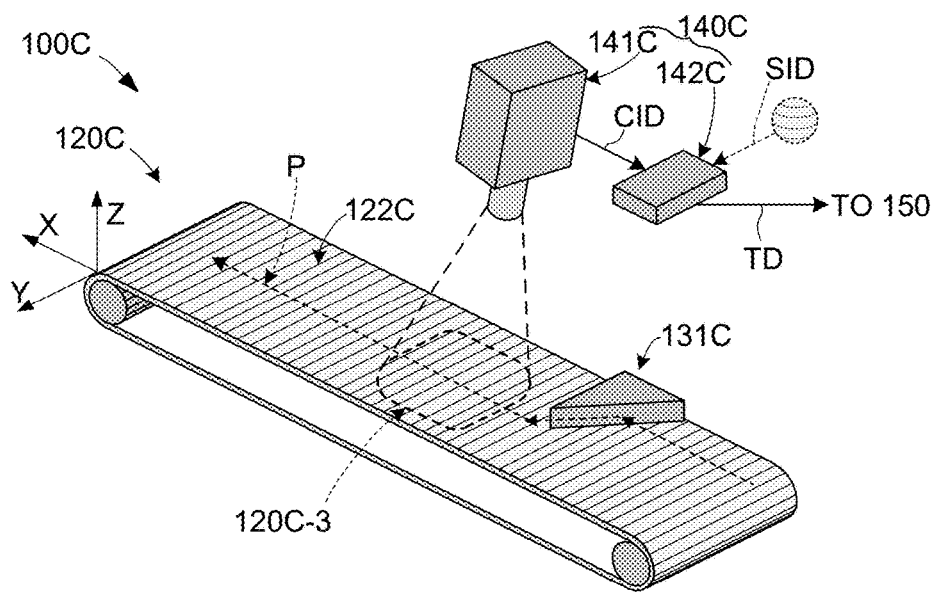
FIG. 6 is a perspective views showing a vision-based sensing system utilized by a work cell to perform the method of FIG. 1 according to another exemplary specific embodiment.

FIG. 6 depicts a partial work cell 100C including a conveyor-belt-type conveying structure 121C, a chicane structure 131C and a vision-based sensing system (vision system) 140C. Conveying structure 121C and chicane structure 131C are assembled and operate in the manner described above with reference to FIGS. 2A and 2B to arrange objects (not shown) into a 1D stream, and to convey the 1D stream on horizontal conveying surface 122C in horizontal path direction P through an image capture (sensing) region 120C-3 located downstream from chicane structure 131C. Vision (sensing) system 140C generally includes a camera 141C and an image processing module 142C. In one embodiment camera 141C is a commercially available digital video camera that is operably mounted over horizontal conveying surface 122C and otherwise configured to capture current image data CID from image capture region 120C-3 and to transmit current image data CID to image processing module 142C. In the current embodiment image processing module 142C is a stand-alone electronic device that is configured using hardware and/or software techniques to identify the target object 91(T3) by comparing the captured current image data CID with stored image data SID, which is transmitted to a processor of image processing module 142C from memory circuitry that is either part of image processing module 142C or a separate memory unit. Stored image data SID operably visually describes target objects according to known image processing techniques that include projection, background subtraction, object segmentation, identification, and Kalman filtering.

FIGS. 7A to 7D depict partial work cell 100C during a simplified exemplary vision-based sensing process performed by vision system 140C. As in previous examples, the simplified process depicted in FIGS. 7A to 7D assumes desired target objects are spherical/circular, and non-desired (secondary) objects are square for purposes of clarity and brevity.

Figure 7A:
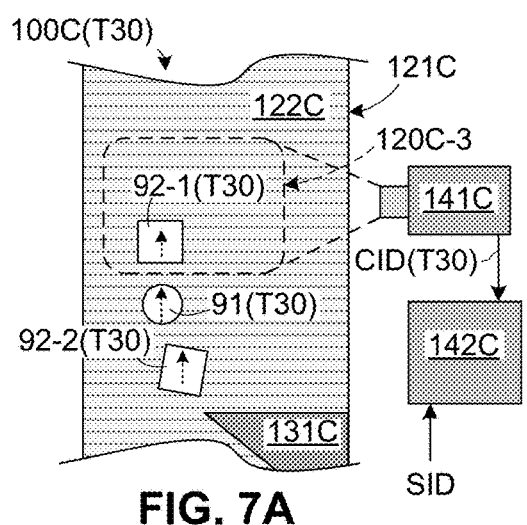
FIGS. 7A, 7B, 7C and 7D are partial top views depicting exemplary object identification and trajectory data calculation operations performed by the vision-based sensing system of FIG. 6.

FIG. 7A depicts work cell 100C at a time T30 after a target object 91(T30), adjacent downstream secondary object 92-1 (T30) and adjacent upstream secondary object 92-2(T30) have been biased into a partial 1D stream by conveying structure 121C and chicane structure 131C in a manner like that described above with reference to FIGS. 3A to 3E. As indicated, at time T30 only downstream object 92-1(T30) has entered image capture region 120C-3, so current image data CID(T30) transmitted from camera 141C to image processing module 142C fails to include a portion that matches stored image data SID, and therefore no additional action is taken by image processing module 142C.

Figure 7B:
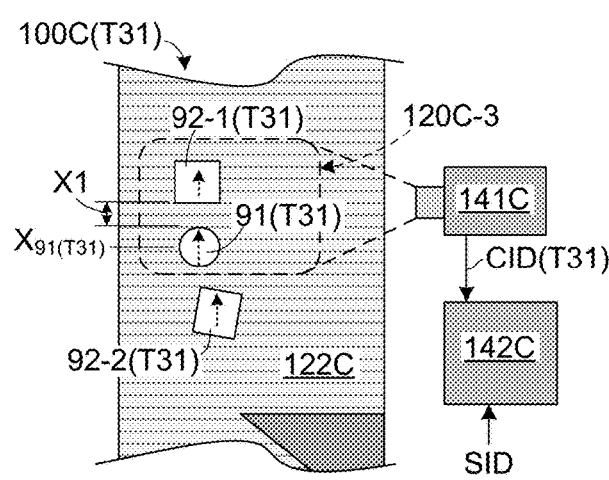

FIG. 7B depicts work cell 100C at a time T31 after incremental movement of horizontal conveying surface 122C has carried target object 91(T31) into image capture region 120C-3. At this point current image data CID(T31) transmitted from camera 141C to image processing module 142C includes an image portion (i.e., the portion generated by the image of target object 91(T31)) that matches stored image data SID. In one embodiment, upon identifying target object 91(T31) using stored image data SID, image processing module 142C generates trajectory data based on a time-based position $X_{92\ (T31)}$ of target object 91(T31), but delays sending this trajectory data until it verifies that target object 92(T31) is sufficiently spaced in the horizontal path direction from adjacent upstream/downstream objects. Note that image capture region 120C-3 is sized such that an image of downstream object 92-1(T31) is also captured as part of current image data CID(T31), which allows image processing module 142C to verify that a spacing X1 between target object 91(T31) and downstream object 92-1(T31) is greater than a predetermined minimum, but insufficient data is available regarding spacing with adjacent upstream secondary target 92-2(T31), which has not yet entered image capture region 120C-3.

Figure 7C:
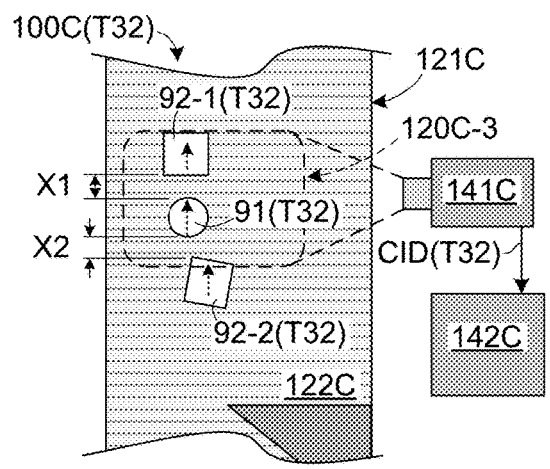
Figure 7D:
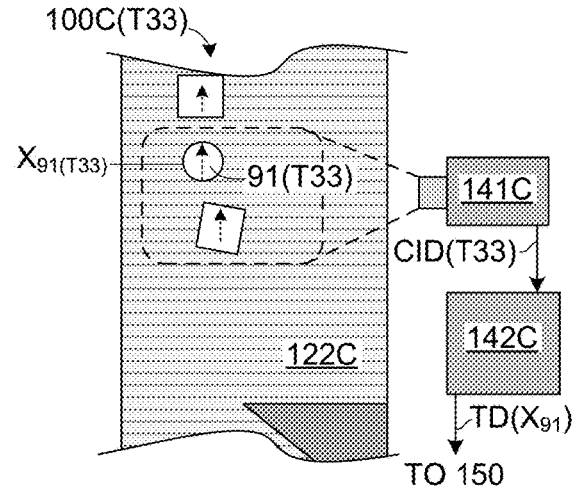

FIG. 7C depicts work cell 100C at a time T32 after incremental movement of horizontal conveying surface 122C has conveyed all three objects (target object 91(T32), downstream object 92-1(T32) and upstream object 92-2 (T32)) into image capture region 120C-3. At this point current image data CID(T32) transmitted from camera 141C to image processing module 142C includes sufficient information to verify that both spacing X1 between target object 91(T32) and adjacent downstream object 92-1(T32) and spacing X2 between target object 91(T32) and adjacent upstream object 92-2(T32) are greater than a predetermined minimum. In one embodiment, upon verifying that target object 92(T32) is sufficiently separated (spaced) from adjacent secondary objects 92-1(T32) and 92-2(T32), image processing module 142C may transmit previously recorded trajectory data (e.g., based on time-based position $X_{92(T31)}$, which was previously generated as mentioned above). In other embodiments, image processing module 142C generates trajectory data using current image data CID(T32), or (as indicated in FIG. 7D) generates trajectory data using current image data CID(T33) indicating time-based position X92(T33) of target object 91(T33) at a subsequent time T33. In any case, as indicated in FIG. 7D, image processing module 142C verifies that target object 91 is separated from both adjacent upstream object 92-1 and adjacent downstream object 92-2 by at least a minimum offset distance before transmitting calculated trajectory data TD(91) to an object removal mechanism 150.

FIG. 8 depicts a partial work cell 100D including a conveyor-belt-type conveying structure 121D, a chicane structure 131D and a robot-based (robotic) object removal mechanism 150D. Conveying structure 121D and chicane structure 131D are assembled and operate in the manner described above with reference to FIGS. 2A and 2B to arrange objects (not shown) into a 1D stream, and to convey the 1D stream on horizontal conveying surface 122D in horizontal path direction P through an image capture (sensing) region 120D-3 to an object removal region 120D-4. Robotic object removal mechanism 150D includes a robot control module 151D, an arm mechanism 152D and a base 153D. Base 153D is fixedly connected to a stationary support structure (not shown). Arm mechanism 152D includes an arm structure 154D that is connected at its fixed (first) end to base 153D, and a brush-type end effector 155D that is connected to free (distal, second) end of arm structure 154D. Arm structure 154D is pivot (rotate) relative to base 152D such that end effector 155D undergoes a swiping motion SM through object removal region 120D-4 in a direction that is substantially perpendicular to the horizontal path direction P (i.e., generally in the Y-axis direction). As indicated in FIG. 9A, brush-type end effector 155D includes a ferrule 156D fixedly connected to the arm structure 154D and flexible bristles 157D that are affixed at one end to ferrule 156D and have bodies that extend downward (away) from ferrule 156D.

As depicted in FIGS. 9A to 9D, during the operation of work cell 100D controller 151D utilizes trajectory data TD received from a sensing system (not shown) such that each swiping motion SM is timed to cause the passage of end effector 155D through object removal region 120D-4 to coincide with the arrival/presence of a corresponding target object in object removal region 120D-4. FIG. 9A depicts a portion of work cell 100D at a time T3 prior to the arrival of a selected target object (e.g., when downstream object 92-1(T3) is in the object removal region). As depicted, brush-type end effector 155D(T3) is maintained in a ready position at time T3 with flexible bristles 157D maintained in contact with horizontal conveying surface 122D, and with end effector 155D(T3) disposed adjacent a side edge of horizontal conveying surface 122D. FIG. 9B depicts work cell 100D at a time T40 when target object 91(T40) is present in the object removal region and at a point when bristles 157D contact target object 91(T40) (i.e., while end effector 155D(T40) is undergoing swiping motion SM across the object removal region), whereby end effector 155D(T40) applies separating force $F_{150D}$ on target object 91(T40). FIG. 9C depicts work cell 100D at a time T41 when end effector 155D(T41) has completed its swiping motion across the object removal region, and target object 91(T41) has been removed from (pushed from) horizontal conveying surface 122D by way of the separating force applied by flexible bristles 157D. FIG. 9D depicts work cell 100D at a time T42 after end effector 155D(T42) has returned to its ready position to prepare for a subsequent target object. As indicated by the dashed-line arrow indicating a return motion RM of end effector 155D between times T41 and T42, end effector 155D is lifted in Z-axis direction by an amount that allows upstream object 92-2(T42) to pass undisturbed through the object removal region on horizontal conveying surface 122D.

FIG. 10 is a simplified diagram showing a robotic work cell 100E configured in accordance with an exemplary practical embodiment of the present invention. Like previous embodiments, work cell 100E includes a continuous loop conveyor mechanism 120E, a singulating mechanism 130E, a vision-type sensing system 140E and a robotic object removal mechanism (robotic mechanism) 150E. Continuous loop conveyor mechanism 120E includes parallel conveyor mechanisms 121E-1 and 121E-2 and belt-switching structures 125E-1 and 125E-2 that are configured and operate to convey objects in a horizontal circuit path CP in the manner described above with reference to FIGS. 4A to 5D. Singulating mechanism 130E includes a first singulating structure 131E-1 that is disposed over horizontal conveying surface 122E-2 of conveying mechanism 121E-2 and functions in the manner described above with reference to FIGS. 3A to 3E. Vision-type sensing system 140E includes a camera 141E configured to capture current image data CID from an image capture region 120E-3, and otherwise functions in a manner like that described above with reference to FIGS. 6 to 7C. Robotic mechanism 150E includes a robot arm/swiper mechanism 152E having a brush-type end effector 155E that functions in a manner like that described above with reference to FIGS. 8 to 9D to individually separate (swipe) selected/target objects from an object removal region 120E-4 for post-separation processing. In a specific embodiment produced for industrial use, conveyor mechanism 120E, singulating mechanism 130E, vision system 140E and robotic mechanism 150E are mounted on aluminum plates that are secured to a custom welded steel frame (not shown) and surrounded by polycarbonate shatter proof windows 101 (indicated by dashed lines) for safety compliance, and post-separation processing is performed by an autobagger unit 200. That is, autobagger unit 200 is positioned such that each removed object 91E(T4) pushed from horizontal conveyor surface 122E-2 is directed by a chute 129E into an input port of autobagger unit 200, and autobagger unit 200 functions to automatically surround each received target object with a protective packaging (e.g., encase each target object in a sealed plastic wrapper) such that packaged objects 91E(T5) output from autobagger unit 200 cannot be directly contacted by human hands until the protective packaging is removed. By performing the entire separation and packaging process automatically, work cell 100E provides a contact-free option for performing separating and packaging operations that previously required human contact. In other embodiments autobagger unit 200 may be replaced with another post-separation processing unit or system.

As indicated in FIG. 10, singulating mechanism 130E differs from previous embodiments by way of including a second singulating structure 131E-2 that is disposed over horizontal conveying surface 122E-1 of conveying mechanism 121E-1. By utilizing at least one singulating structure disposed over each horizontal conveying surface 122E-1 and 122E-2 of continuous loop conveying mechanism 120E, singulating mechanism 130E functions to enhance the efficiency of work cell 100E by providing fully singulated (separated) objects in a shorter amount of time after the objects are dispensed than may be possible using a single singulation singulating structure.

Work cell 100E further includes a central control unit 160E that is operably coupled and configured to coordinate communications between a hopper (dispensing unit) 110E, conveyor mechanism 120E, sensing system 140E and robotic mechanism 150E in the manner described below to facilitate processing and individually packaging objects provided in a 3D cluster in a completely automated contact-free manner. Central control unit 160E is configured to communicate with hopper 110E by way of hopper control/status signals H, communicates with robot arm/swiper mechanism 152E using robot control signals RC, and communicates with autobagger unit 200 using autobagger control/status signals AB. As indicated at the top of FIG. 10, hopper 110E is fixedly disposed over horizontal conveying surface 122E-1 and is configured to receive and store 3D cluster 90E-3D, and to selectively dispense (deposit) at least a portion of stored 3D cluster 90E-3D onto horizontal conveying surface 122E-1 in receiving region 120E-1. These and other exemplary coordinated operations performed by hopper 110E, conveyor mechanism 120E, sensing system 140E and robotic mechanism 150E are described below with reference to FIGS. 11 and 12A to 12G. Central control unit 160E also transmits speed control signals SC to conveyor mechanism 120E for reasons explained above and receives current image data CID from camera 141E of sensing system 140E for reasons described below. In one embodiment central control unit 160E is also configured to communicate with a cloud server (not shown) over a network bus 85 (e.g., the Internet or a local area network, not shown), where the cloud server functions to develop operating system software updates for use by central control unit 160E. Note that central processing unit 160E is depicted as a desktop PC that stores/receives image data SID using an external memory device 165E for illustrative purposes only, and that these electronic devices may be integrated and/or implemented using any suitable computing and/or storage device.

Figure 11:
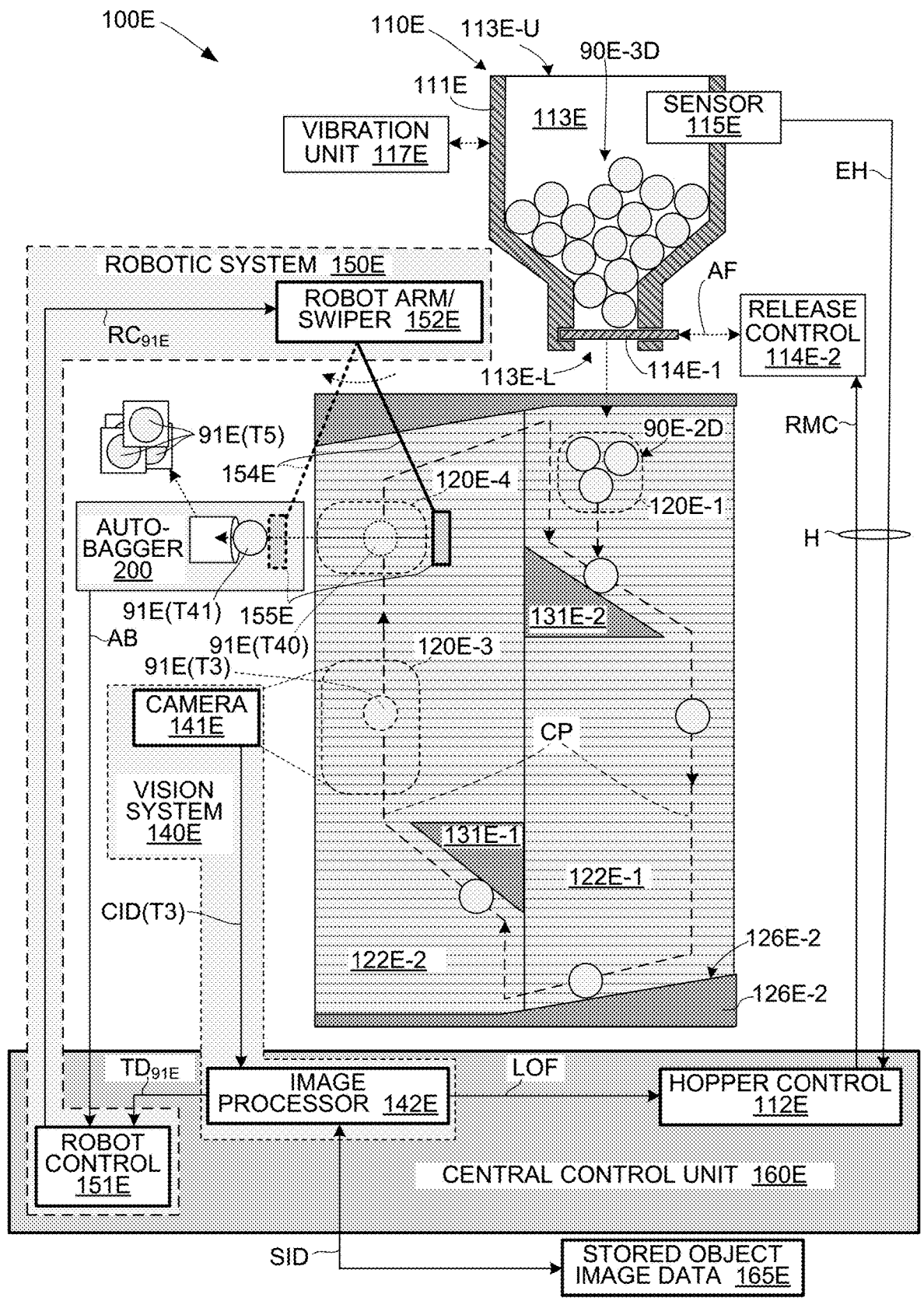
FIG. 11 is a simplified diagram depicting an exemplary method for automatically separating a target object from a 3D cluster using the robotic work cell of FIG. 10 according to another exemplary specific embodiment.

FIG. 11 is a hybrid block diagram depicting selected portions of work cell 100E in additional detail. Referring to the upper portion of FIG. 11, hopper 110E includes a tapered peripheral wall 111E that surrounds a storage chamber 113E accessible by way of an upper opening 113E-U and a lower opening 113E-L. Objects forming 3D cluster 90E-3D are entered into hopper 110E by way of being poured or otherwise transferred from a transport container (e.g., a box or bag) through upper opening 113E-U into storage chamber 113E. Hopper 110E includes a release mechanism including a door (or other structure) 114E-1 that is positioned by a release control circuit 114E-2 in a closed position that blocks close lower opening 113E-L, thus retaining 3D cluster 90E-3D within storage chamber 113E, and operably moves door 114E-1 (e.g., by way of an actuating force AF) into an opened position (e.g., in response to assertion of a release mechanism control signal RMC), thereby allowing some or all of the objects stored in storage chamber 113E to pass through lower opening 113E-L and form a 2D array 90E-2D in receiving region 120E-1 on horizontal conveying surface 122E-1. Hopper 110E also includes an "empty-bin" sensor 115E that generates an empty hopper signal EH after 3D cluster 90E-3D has been entirely dispensed and storage chamber 113E is empty, and a vibration unit 117E configured to facilitate release of objects stored in the storage chamber 113E by way of vibrating peripheral w Referring to the lower portion of FIG. 11, central control unit 160E is configured to implement a hopper control module 112E, an image processing module 142E (which forms vision/sensing system 140E in combination with camera 141E), and a robot control circuit 151E (which forms robotic mechanism 150E in combination with robot arm mechanism 152E). Like previous embodiments, image processing module 142E is configured to receive current image data from camera 141E, to identify a target object passing through image capture region 120E-3 by comparing the current image data with stored image data SID, and to calculate trajectory data for each identified target object that is then utilized by object removal mechanism 150A to swipe the selected target object into autobagger unit 200. For example, when current image data CID(T3) generated by camera 141E at a time T3 is used to identify target object 91E(T3), image processing module 142E generates associated trajectory data $TD_{91E}$ that is then utilized by object removal mechanism 150A to remove target object 91E at a subsequent time T40. In this case, trajectory data $TD_{91E}$ is transmitted by image processing module 142E to robot control module 151E within central control unit 160E, and robot control unit utilizes trajectory data $TD_{91E}$ to generate a corresponding robot control signal $RC_{91E}$ that causes robot arm 154E to pivot at a time T40 such that end effector 155E swipes selected target object 91E(T40) into autobagger unit 200, which then packages target object 91E(T41) and then ejects packaged target object 91E(T5). Image processing module 142E is further configured to monitor a quantity of objects disposed on the continuous loop conveying mechanism (i.e., the total number of objects disposed on horizontal conveying surfaces 122E-1 and 122E-2 at a given time), and to assert a low object flow signal LOF when this quantity falls below a predetermined minimum number, and hopper control module 112E is configured to assert release mechanism control signal RMC in response to the assertion of low object flow signal LOF, whereby a predetermined number of objects are dispensed from hopper 110E into receiving region 120E-1, for example, to maintain the quantity of conveyed objects within a predetermined optimal range. Finally, autobagger unit 200 is configured to assert a ready status signal AB when it is available to receive a next target object for packaging and to de-assert ready status signal AB when it is busy packaging a current/previously received target object, and robot control module 151E is further configured to generate a robot control signal for target object 91E using the trajectory data $TD_{91E}$ only when ready status signal AB is asserted. In an alternative embodiment a ready status signal is transmitted to image processing module 142E, and image processing module 142E is configured to generate/transmit trajectory data $TD_{91E}$ only if the ready status signal is asserted when target object 91E(T3) is disposed in image capture region 120E-3.

Figure 12A:
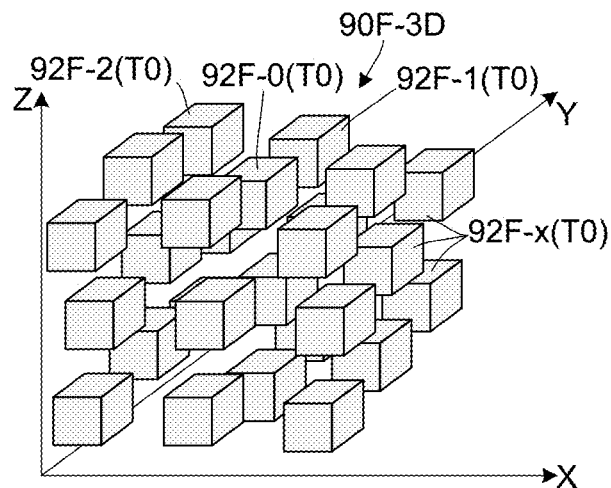
FIGS. 12A, 12B, 12C, 12D, 12E, 12F and 12G are simplified perspective views depicting a method for individually separating objects disposed in a 3D cluster according to another exemplary specific embodiment.
Figure 12B:
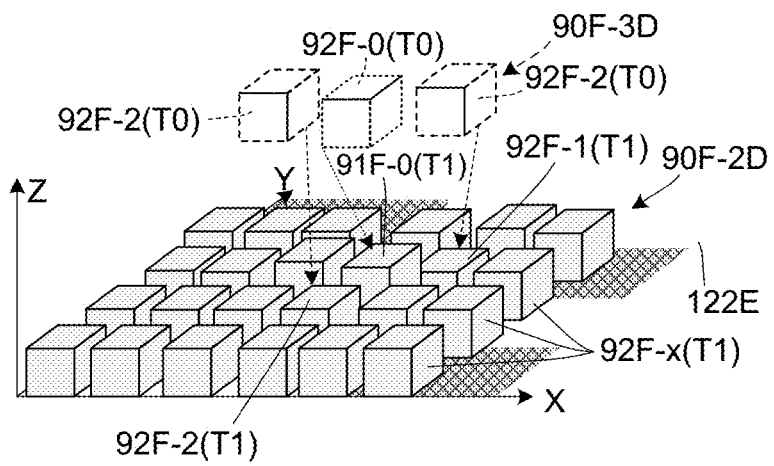
Figure 12C:
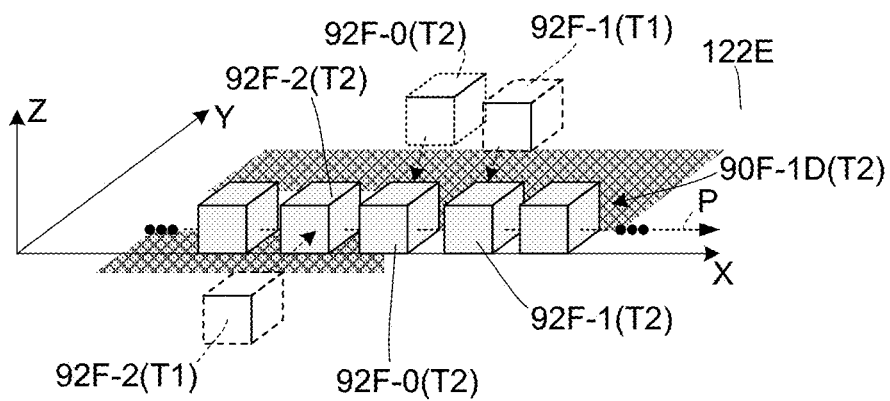
Figure 12D:
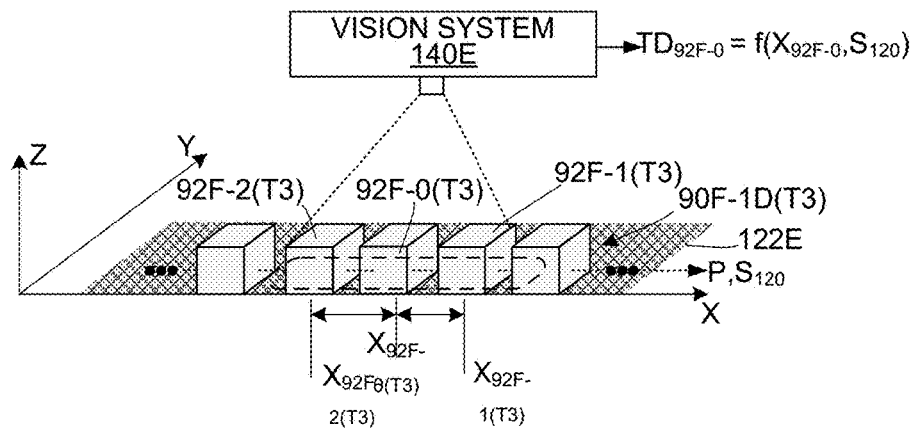
Figure 12E:
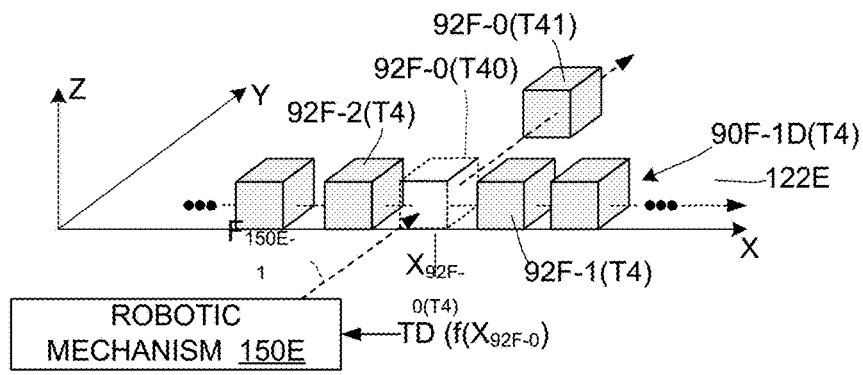
Figure 12F:
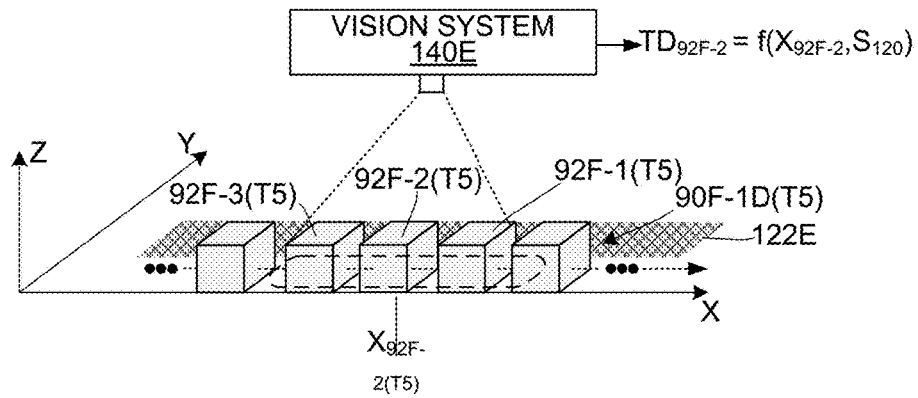
Figure 12G:
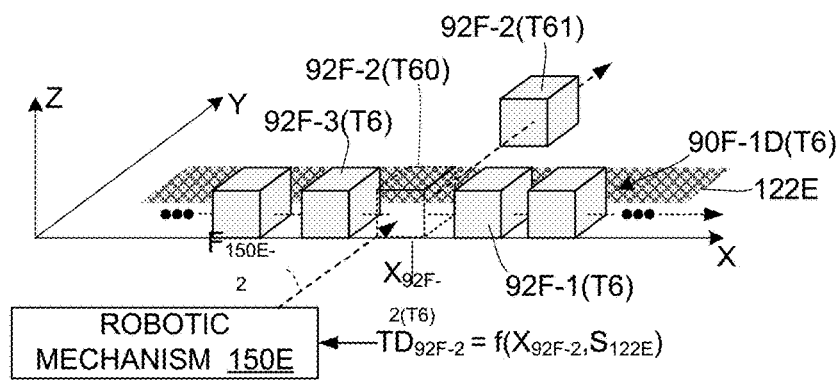

FIGS. 1 to 11 collectively illustrate how work cells produced in accordance with the present invention may be used to implement a method for automatically separating one or more selected (target) objects from 3D clusters including both the selected objects and other (secondary) objects. For explanatory purposes, these examples depict target objects as being different from non-selected (secondary) objects (e.g., the target objects are depicted as spherical or circular objects and the secondary objects are depicted as cube-shaped or square objects). Although the various work cells may be utilized to remove one or more selected target objects from 3D clusters containing secondary objects having different shapes, they may also be utilized to individually separate identical objects disposed in a 3D cluster by way of designating a given selected object as the target object, and by designating adjacent non-selected objects as secondary objects, even if they are identical in all respects to the selected object. For example, FIGS. 12A to 12D illustrate in a simplified manner how work cell 100E (see FIGS. 10 and 11) may be utilized to automatically separate essentially identical objects are provided in a 3D cluster. Specifically, FIG. 12A depicts multiple objects 92F-x at a time T0 when they collectively for a 3D cluster 90F-3D in the manner described above, where each object is essentially identical in appearance to all other objects in 3D cluster 90F-3D (e.g., object 92F-1(T0) is identical to objects 92F-2(T0) and 92F-3(T0)). FIG. 12B depicts a dispensing operation at a time T1 in which objects 92F-x are dropped or otherwise dispensed (e.g., by hopper 110E, shown in FIG. 10) onto horizontal conveying surface 122E (which collectively represents surfaces 122E-1 and 112E-2 in FIGS. 10 and 11), whereby the objects forming 3D cluster 90F-3D at time T0 (e.g., objects 92F-1(T0), 92F-2(T0) and 92F-3(T0)) collapse into 2D array 90F-2D (i.e., such that all objects 92F-x(T1) including objects 92F-1(T1), 92F-2(T1) and 92F-3(T1) are disposed in the same X-Y plane defined by horizontal conveying surface 122E). FIG. 12C depicts shifting the X,Y locations of objects 92F-1(T1), 92F-2(T1) and 92F-3(T1) such that they are reconfigured as a 1D stream 90F-1D in which shifted objects 92F-1(T2), 92F-2(T2) and 92F-3(T2) are moved in single file on horizontal conveying surface 122E along horizontal path direction P such that each object is positioned between and respectively spaced in the horizontal path direction P from adjacent upstream and downstream objects (e.g., object 92F-0(T2) is disposed between and spaced from adjacent downstream object 92F-1(T2) and adjacent upstream object 92F-2(T2)). FIG. 12D depicts 1D stream 90F-1D at a time T3 during which vision system 140E selects "target" object 92F-0(T3) and generates trajectory data $TD_{92F\text{-}0}$, which is calculated as a function of a position/location $X_{92F\text{-}0}$ on surface 122E and its conveying speed $S_{122E}$. In one embodiment, the identification/selection of a target object by vision system 140E is performed (i.e., a "next" object is selected for removal) only when one or more other mechanisms or systems provide a ready signal or other control signal (e.g., ready status signal AB generated by autobagger unit 200 as described above with reference to FIG. 11). In addition, as indicated at the bottom of FIG. 12D, before transmitting trajectory data $TD_{92F\text{-}0}$, vision system 140E also verifies that selected object 92-0(T3) is spaced by at least a predetermined minimum distance from adjacent downstream object 92-1(T3) and adjacent upstream object 92-1(T3) (i.e., that the indicated distances between nominal location $X_{92F\text{-}0(T3)}$ of selected target object 92-0(T3) and nominal locations $X_{92F\text{-}1(T3)}$ and $X_{92F\text{-}2(T3)}$ are greater than a predetermined minimum). FIG. 12E depicts the application of a separating force $F_{150E\text{-}1}$ by robotic mechanism 150E on selected object 92F-0(T40) in accordance with calculated trajectory data $TD_{92F\text{-}0}$ such that only selected object 92F-0(T41) is removed from 1D stream 90F-1D (e.g., such that adjacent non-selected "secondary" objects 92F-1 (T4) and 92F-2(T4) remain undisturbed and continue moving on the horizontal conveying surface 122E). As indicated in FIG. 12F, after object 92F-0 has been removed from 1D stream 90F-1D, non-selected objects 92F-1 and 92F-2 are conveyed around the continuous loop path and eventually pass again through image capture region 120E-3 at a time T5. Note that one or more selected objects may be removed between times T4 and T5 (i.e., while non-selected objects 92F-1 and 92F-2 are conveyed around one continuous loop circuit as described above with reference to FIGS. 10 and 11). Also note that, due to random re-arrangement of the objects, object 92F-2 is depicted at time T5 as being disposed between object 92F-0(T5) and an object 92F-3 (T5). In this example, object 92F-2(T5) is selected as a current target object for removal by vision system 140E using the criteria set forth above, whereby vision system 140E generates trajectory data $TD_{92F\text{-}2}$ as a function of a position/location $X_{92F\text{-}2}$ and conveying speed $S_{122E}$ at time T5. FIG. 12G depicts the subsequent application of a (second) separating force $F_{150E\text{-}2}$ by robotic mechanism 150E on (second) selected target object 92F-2(T60) in accordance with calculated trajectory data $TD_{92F\text{-}2}$ such that only selected object 92F-0(T61) is removed from 1D stream 90F-1D at time T61 (e.g., such that adjacent non-selected secondary objects 92F-1(T6) and 92F-3(T6) remain undisturbed and continue moving on the horizontal conveying surface 122E). As illustrated by this example, object 92F-2 is designated as a non-selected secondary object at time T3, and re-designated as a selected target object at time T5.

Figure 13A:
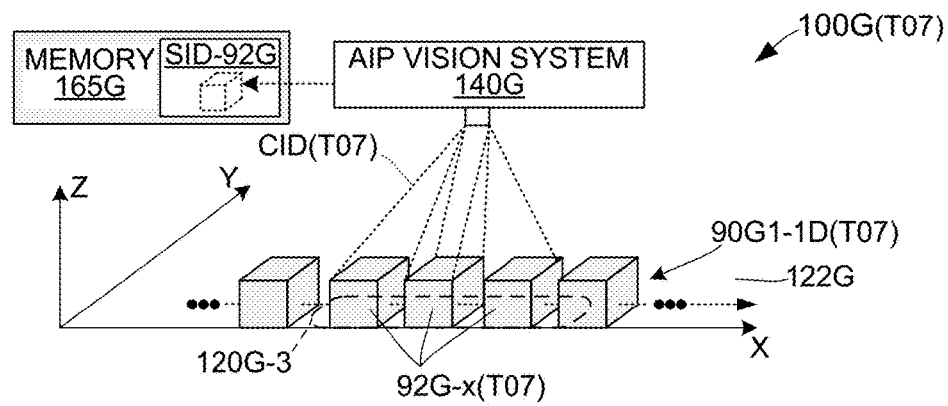
FIGS. 13A, 13B, 13C and 13D are simplified views depicting a work cell including an artificial intelligence powered vision system that generates stored image data for new object types during an initial learning phase according to another exemplary specific embodiment.
Figure 13B:
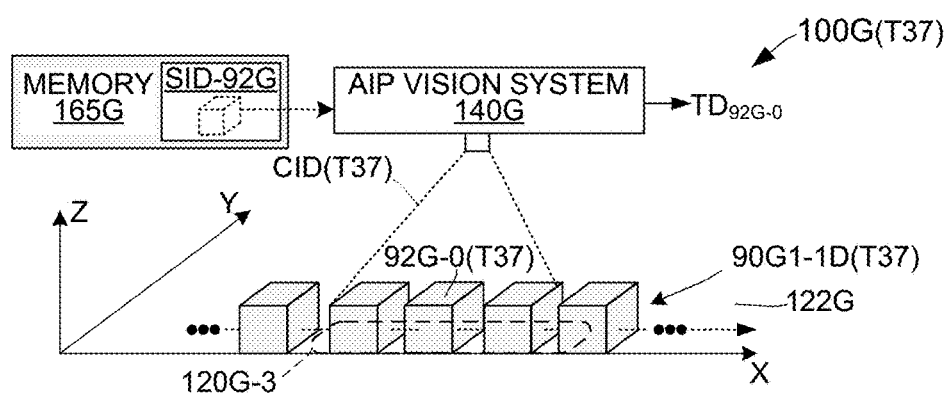
Figure 13C:
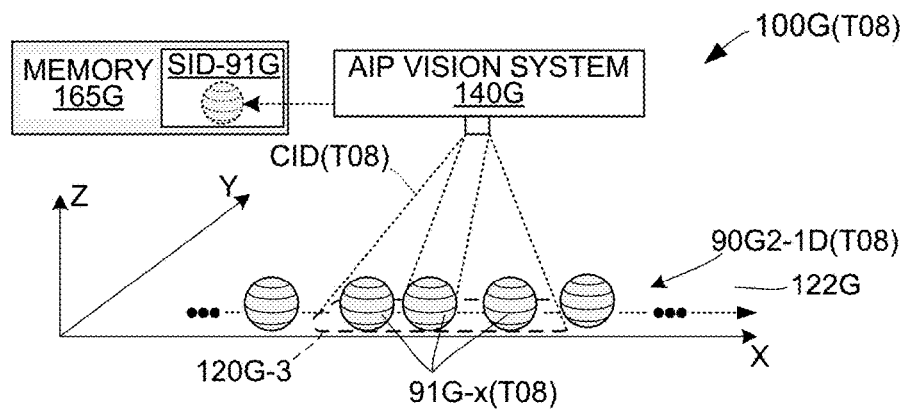
Figure 13D:
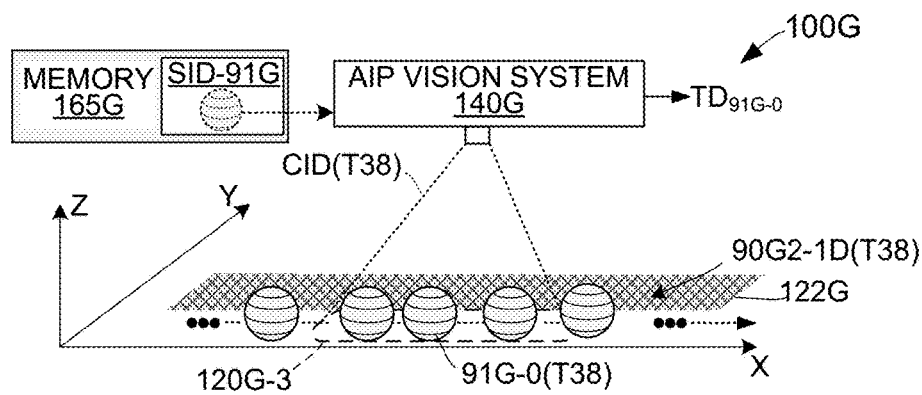

FIGS. 13A to 13D illustrate a partial work cell 100G according to another embodiment that implements an artificial-intelligence-powered (AIP) vision system 140G configured to implement the various functions mentioned above and is also configured to implement self-learning algorithms that allow work cell 100G to operate in an object-agnostic (item-agnostic) manner. FIG. 13A depicts work cell 100G during a first learning phase (time T07) soon after a first 3D cluster including square-shaped objects 92G-x has been dispensed onto a horizontal conveying surface 122G and singulated into 1D stream 90G1-1D(107) in the manner described above. During the first learning phase AIP vision system 140G utilizes a camera (not shown) to generate current image data CID(T07) of 1D stream 90G1-1D(107) as objects 91G-x(107) move through imaged region 120G-3, and in a presently preferred embodiment utilizes a combination of k-nearest neighbors and neural net-based techniques to process current image data CID(T07), to generate stored image data SID-92G that operably visually describes each object 92G-x, and to write (data transfer) stored image data SID-92G into memory 165G. As indicated in FIG. 13B, during subsequent normal operations of work cell 100G (e.g., at a time T37), AIP vision system 140G utilizes stored image data SID-92G to identify a target object 92G-0(T37) for removal/separation by way of comparing current image data CID(T37) of 1D stream 90G1-1D(T37) with stored image data SID-92G, and then calculates corresponding trajectory data $TD_{92G-0}$ in the manner described above. FIGS. 13C and 13D depicts the use of work cell 100G after processing of object 92-x has been completed. That is, FIG. 13A depicts work cell 100G during a second learning phase (time T08) soon after a second 3D cluster including spherical objects 91G-x has been dispensed onto a horizontal conveying surface 122G and singulated into 1D stream 90G2-1D(108), whereby AIP vision system 140G generates stored image data SID-91G that operably visually describes each object 91G-x. Referring to FIG. 13D, during subsequent normal operations AIP vision system 140G utilizes stored image data SID-91G to identify a target object 91G-0(T38) for removal/separation by way of comparing current image data CID(T38) of 1D stream 90G2-1D(T37) with stored image data SID-91G, and then calculates corresponding trajectory data $TD_{91G-0}$ in the manner described above. As depicted in the examples shown in FIGS. 13A to 13D, the use of AIP vision system 140G allows work cell 100G to process objects having any shape, making work cell 100G item-agnostic. Moreover, in practical embodiments using work cell configurations like those illustrated in FIGS. 10 and 11, typical learning phases were completed in approximately 30 seconds for a wide range of objects, and subsequent normal processing was performed at an average rate of 40 objects per minute.

As used herein, the terms "module", "algorithm", "software" and "program" are defined as follows. The term "module" signifies a tangible information processing device that typically is limited in size and/or complexity. For example, one or more methods or procedures in a computer program can be referred to as a module. A module can also refer to a small network of digital logic devices, in which the logic devices often may be interconnected to form a network. A module can be permanently configured (e.g., hard-wired to form hardware), temporarily configured (e.g., programmed with software), or a combination of the two configurations (for example, a structured ASIC). The term "algorithm" signifies a sequence or set of operations or instructions that a module can use to transform information to achieve a result. A module can comprise one or more algorithms. As used herein, the terms "software" and "program" signify one or more algorithms and data structures that configure an information processing device for use in the innovations, embodiments and examples described in this specification.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A work cell for automatically separating a target object from a plurality of secondary objects that are collectively disposed in a three-dimensional (3D) cluster, the work cell comprising:

a conveying mechanism including a conveying structure having a horizontal conveying surface configured such that said target object and said plurality of secondary objects form a two-dimensional (2D) array on the horizontal conveying surface when the 3D cluster is dispensed onto the conveying structure, said conveying mechanism also including a drive mechanism configured to drive the conveying structure such that the 2D array is conveyed on the horizontal conveying surface along a horizontal path;

a singulating mechanism operably configured to form the 2D array into a substantially one-dimensional (1D) stream on the horizontal conveying surface such that the target object becomes spaced from the plurality of secondary objects along the horizontal path;

a sensing system configured to identify the target object in the 1D stream and configured to calculate trajectory data for the target object; and an object removal mechanism configured to selectively apply a separating force on the target object in accordance with the calculated trajectory data such that the target object is removed from the horizontal conveying surface, wherein said conveying mechanism comprises:

a first conveyor belt trained over first horizontally oriented drive rollers such that a first upward facing portion of the first conveyor belt forms a first portion of said horizontal conveying surface;

a second conveyor belt trained over second horizontally oriented drive rollers such that a second upward facing portion of the second conveyor belt forms a second portion of said horizontal conveying surface, wherein said first and second conveyor belts are disposed in a parallel side-by-side arrangement and separately driven such that said first upward facing portion moves in a first horizontal path direction, and such that said second upward facing portion moves in a second horizontal path direction, said second horizontal path direction being opposite to said first horizontal path direction, wherein said conveying mechanism further comprises first and second belt-switching structures respectively disposed over end portions of said first and second conveyor belts, said first belt-switching structure being operably configured such that each said secondary object conveyed in said first horizontal path direction to a first downstream end of said first upward facing portion is transferred onto a second upstream end of said second upward facing portion, and said second belt-switching structure being operably configured such that said each secondary object conveyed in said second horizontal path direction to a second downstream end of said second upward facing portion is transferred onto a first upstream end of said first upward facing portion, wherein the sensing system comprises:

a camera configured to capture current image data of the 1D stream as the horizontal conveying surface moves the target object through an imaged region; and an image processing module configured to identify the target object by comparing the captured current image data with stored image data that operably visually describes the target object, said image processing module also being configured to calculate said trajectory data for the target object by determining a location of the identified target object on the horizontal conveying surface, wherein the work cell further comprises a central control unit operably coupled between at least a portion of the sensing system and at least a portion of the object removal mechanism, and wherein the central control unit is configured to implement the image processing module, wherein the image processing module is further configured to monitor a quantity of objects disposed on said horizontal conveying surface and to assert a low object flow signal when said quantity of objects falls below a predetermined minimum number, and wherein the work cell further comprises a dispensing unit configured to store the 3D cluster and to deposit at least a portion of said 3D cluster onto said horizontal conveying surface each time the low object flow signal is asserted.

\* \* \* \* \*